United States Patent
Stein

(10) Patent No.: US 9,188,483 B2
(45) Date of Patent: Nov. 17, 2015

(54) ELECTRICALLY-AUGMENTED DAMPING

(75) Inventor: John T. Stein, Brookfield, CT (US)

(73) Assignee: SMITHS DETECTION INC., Danbury, CT (US)

( * ) Notice: Subject to any disclaimer, the term of this patent is extended or adjusted under 35 U.S.C. 154(b) by 0 days.

(21) Appl. No.: 13/992,593

(22) PCT Filed: Dec. 9, 2011

(86) PCT No.: PCT/US2011/064170
§ 371 (c)(1),
(2), (4) Date: Sep. 9, 2013

(87) PCT Pub. No.: WO2012/078988
PCT Pub. Date: Jun. 14, 2012

(65) Prior Publication Data
US 2013/0335737 A1     Dec. 19, 2013

Related U.S. Application Data

(60) Provisional application No. 61/421,486, filed on Dec. 9, 2010.

(51) Int. Cl.
*H02P 29/00* (2006.01)
*G01J 3/02* (2006.01)
*G01J 3/06* (2006.01)
*G01J 3/453* (2006.01)

(52) U.S. Cl.
CPC ............... *G01J 3/0202* (2013.01); *G01J 3/06* (2013.01); *G01J 3/4535* (2013.01); *H02P 29/00* (2013.01)

(58) Field of Classification Search
CPC .................................................. H02P 29/00
USPC .................... 318/448, 127, 445, 447
See application file for complete search history.

(56) References Cited

U.S. PATENT DOCUMENTS

| | | | |
|---|---|---|---|
| 3,883,799 A | 5/1975 | Ulyanov | |
| 4,500,821 A | 2/1985 | Bitting et al. | |
| 5,589,749 A | 12/1996 | Davidson et al. | |
| 6,359,748 B1 | 3/2002 | Goker | |
| 6,791,786 B2 * | 9/2004 | He et al. | 360/78.05 |
| 7,148,648 B2 * | 12/2006 | Okano | 318/638 |
| 2002/0101681 A1 | 8/2002 | He et al. | |
| 2010/0204881 A1 * | 8/2010 | Muragishi et al. | 701/36 |

* cited by examiner

*Primary Examiner* — David S Luo
(74) *Attorney, Agent, or Firm* — Casimir Jones S.C.

(57) ABSTRACT

Provided herein are devices, systems, and methods for electrically-augmented damping of an actuator and associated devices. In particular, electrically-augmented damping derived from measurement of voltage across an actuator and current flowing through an actuator is provided.

14 Claims, 13 Drawing Sheets

US 9,188,483 B2

ELECTRICALLY-AUGMENTED DAMPING

CROSS-REFERENCE TO RELATED APPLICATION

The present invention is a national phase application under 35 U.S.C. §371 of PCT International Application No. PCT/US2011/064170, filed Dec. 9, 2011, which claims priority to U.S. Provisional Patent Application Ser. No. 61/421,486 filed Dec. 9, 2010, which is hereby incorporated by reference in its entirety.

FIELD

Provided herein are devices, systems, and methods for electrically-augmented damping of an actuator and associated devices. In particular, electrically-augmented damping derived from measurement of voltage across an actuator and current flowing through an actuator is provided.

BACKGROUND

Fourier transform interferometric spectrometers are widely used in the analysis of chemical compounds. By measuring the absorption of radiation by an unknown sample at various wave lengths and comparing the results with known standards, these instruments generate useful information with respect to the chemical makeup of the unknown sample.

Conventional Fourier-transform (FT) spectrometers are based on Michelson interferometer arrangements. In a typical FT spectrometer, light from a light emitting source is collected, passed through an interferometer and sample to be analyzed, and is brought to focus on a detector (Saptari, Vidi, Fourier-Transform Spectroscopy Instrumentation Engineering. SPIE Press, Bellingham Wash., Vol. No.: TT61 (2004), herein incorporated by reference in its entirety). The interferometer system, in combination with the sample, modulates the intensity of the light that strikes the detector, and thereby forms a time variant intensity signal. A detector, analog-to-digital converter, and processor then receive, convert, and analyze the signal.

In an FT spectrometer utilizing an interferometer (SEE FIG. 1), input light is divided into two beams by a beam splitter. One beam is reflected off a fixed mirror and one off a moving mirror. While the path length of the beam striking the fixed mirror is substantially constant, movement of the moving mirror alters the path length of the other beam, thereby changing the distance the beam travels in comparison to the reference beam (e.g., the beam reflected off the fixed mirror. This changing path length introduces a time delay between the beams upon reaching the detector. The time-offset beams interfere or reinforce each other, allowing the temporal coherence of the light to be measured at different time delay settings, effectively converting the time domain into a spatial coordinate. Measurements of the signal at many discrete positions of the moving mirror are used to construct a spectrum using a FT of the temporal coherence of the light. The power spectrum of the FT of the interferogram corresponds to the spectral distribution of the input light. The moving mirror allows a time-domain interferogram to be generated which, when analyzed, allows high resolution frequency-domain spectra to be produced. A Fourier transform is performed on the data to produce a spectrum which shows spectral-energy versus frequency.

It is critical in the design of these instruments that the surface of the moving mirror be very accurately held in an orthogonal position, both to the fixed mirror and to the direction of the motion of the moving mirror. Mirror positional accuracy is of importance because deviations in the mirror alignment produce small errors in the time-domain interferogram which may translate into large errors in the frequency-domain spectrum. In a typical interferometer, mirror deviations larger than one wave length of the analytical radiation are considered significant and can degrade the quality of the entire instrument. Contemporary high- and moderate-performance Fourier-transform spectrometry instruments may utilize stabilization assemblies, typically flexure assemblies, to support the moving mirror in the interest of minimizing mechanical hysteresis and other non-linear effects.

Despite all measures taken to reduce undesired alteration of the moving mirror's position, some degree of unwanted or unintended deviation may occur in even high quality systems. The motion of the mirror in response to applied force is described by a second-order differential equation whose coefficients are determined by the mass of the moving mirror, the effective spring constant of the flexures, the frictional loss introduced by suspension, and viscous loss introduced by motion through the atmosphere. Forces directed at the moving mirror may be a result of a command sent to the mirror actuator (e.g., a voice-coil actuator) as part of the normal function of the FTS instrument, or may be undesired disturbances, caused, for example, by incidental motion of the entire instrument. The frictional losses present in the flexure suspension are very low, a condition which leads to a lightly-damped system response to applied force. Such a system is significantly more difficult to control than one with a greater level of inherent damping. The lightly-damped system is also more susceptible to externally-produced disturbance forces than one with greater damping.

SUMMARY

In some embodiments, provided herein are methods of providing electrically-augmented damping of a voice-coil actuator comprising: subtracting a rate-feedback voltage from an actuator command voltage, wherein the rate feedback voltage is derived from measurement of voltage across the actuator and current flowing through the actuator. In some embodiments, the voltage across the actuator comprises a component due to the flow of current through impedances of the actuator, and a component due to movement of an armature. In some embodiments, the rate-feedback voltage is derived by subtracting a voltage equal to the component of the voltage across the actuator due to the flow of current through the impedances of the actuator from the voltage across the actuator. In some embodiments, the voltage is equal to the component of the voltage across the actuator due to the flow of current through the impedances of the actuator is derived by scaling the voltage appearing at terminal $\beta$ (the bottom of the actuator). In some embodiments, the voltage appearing at terminal $\beta$ (the bottom of the actuator) is only a function of the current flowing through the actuator. In some embodiments, the voltage appearing at terminal $\beta$ (the bottom of the actuator) is substantially a function only of the current flowing through the actuator. In some embodiments, the electrically-augmented damping results in reduced performance anomalies for the voice-coil actuator. In some embodiments, the rate-feedback voltage is calculated without use of a velocity sensor.

In some embodiments, provided herein are systems and devices comprising circuitry for providing electrically-augmented damping of a voice-coil actuator, comprising: (a) a transconductance amplifer A1, wherein an output of the transconductance amplifier A1 is a function of: (i) command voltage, and (ii) a rate-feedback voltage; (b) an actuator, wherein the actuator comprises: (i) a permanent magnet, and (ii) an armature that carries current through a magnetic field associated with the permanent magnet; (c) an amplifier A2, wherein an output of the amplifier A2 is a function of the voltage appearing at terminal β (the bottom of the actuator); and (d) an amplifier A3, wherein an output of the amplifier A3 is a function of: (i) the voltage appearing at terminal α (the top of the actuator), and (ii) a voltage proportional to the component of the voltage appearing at terminal α (the top of the actuator) due to the flow of current through the actuator. In some embodiments, the output of the transconductance amplifier A1 flows into the actuator. In some embodiments, the voltage appearing at terminal β (the bottom of the actuator) is a function of flow of current through the actuator. In some embodiments, the voltage appearing at terminal α (the top of the actuator) is a function of: (i) flow of current through the actuator, and (ii) movement of the armature through the magnetic field associated with the permanent magnet. In some embodiments, the amplifier A2 scales and inverts the voltage appearing at terminal β (the bottom of the actuator) to produce a voltage equal in magnitude to, but 180 degrees out of phase with, the component of the voltage across appearing at terminal α (the top of the actuator) due to the flow of current through the actuator. In some embodiments, the output of amplifier A3 is the sum of the output of amplifier A2 and the voltage appearing at terminal α (the top of the actuator). In some embodiments, the output of amplifier A3 is equal to the voltage resulting from the movement of the armature through the magnetic field associated with the permanent magnet. In some embodiments, the output of amplifier A3 is the rate-feedback voltage.

In some embodiments, provided herein are voice-coil actuators associated with a system for electrically-augmented damping. In some embodiments, a rate-feedback voltage is subtracted from an actuator command voltage to effectively damp the voice-coil actuator. In some embodiments, the rate feedback voltage is derived from measurement of voltage across the actuator and current flowing through the actuator. In some embodiments, the electrically-augmented damping results in reduced performance anomalies for the voice-coil actuator. In some embodiments, the rate-feedback voltage is calculated without use of a velocity sensor.

In some embodiments, provided herein are Fourier-transform spectrometers comprising an optical path-length modulator utilizing a voice-coil actuator and comprising a system for electrically-augmented damping. In some embodiments, a rate-feedback voltage is subtracted from the actuator command voltage to effectively damp the voice-coil actuator. In some embodiments, the rate feedback voltage is derived from measurement of voltage across the actuator and current flowing through the actuator. In some embodiments, the rate-feedback voltage is calculated without use of a velocity sensor. In some embodiments, the electrically-augmented damping results in reduced performance anomalies for the voice-coil actuator. In some embodiments, reduced performance anomalies for the voice-coil actuator provide a reduction in errors in time-domain interferograms, a reduction in errors in frequency-domain spectrum, and improved spectrometer performance.

BRIEF DESCRIPTION OF THE DRAWINGS

The foregoing summary and detailed description is better understood when read in conjunction with the accompanying drawings which are included by way of example and not by way of limitation.

DEFINITIONS

Figure 1:
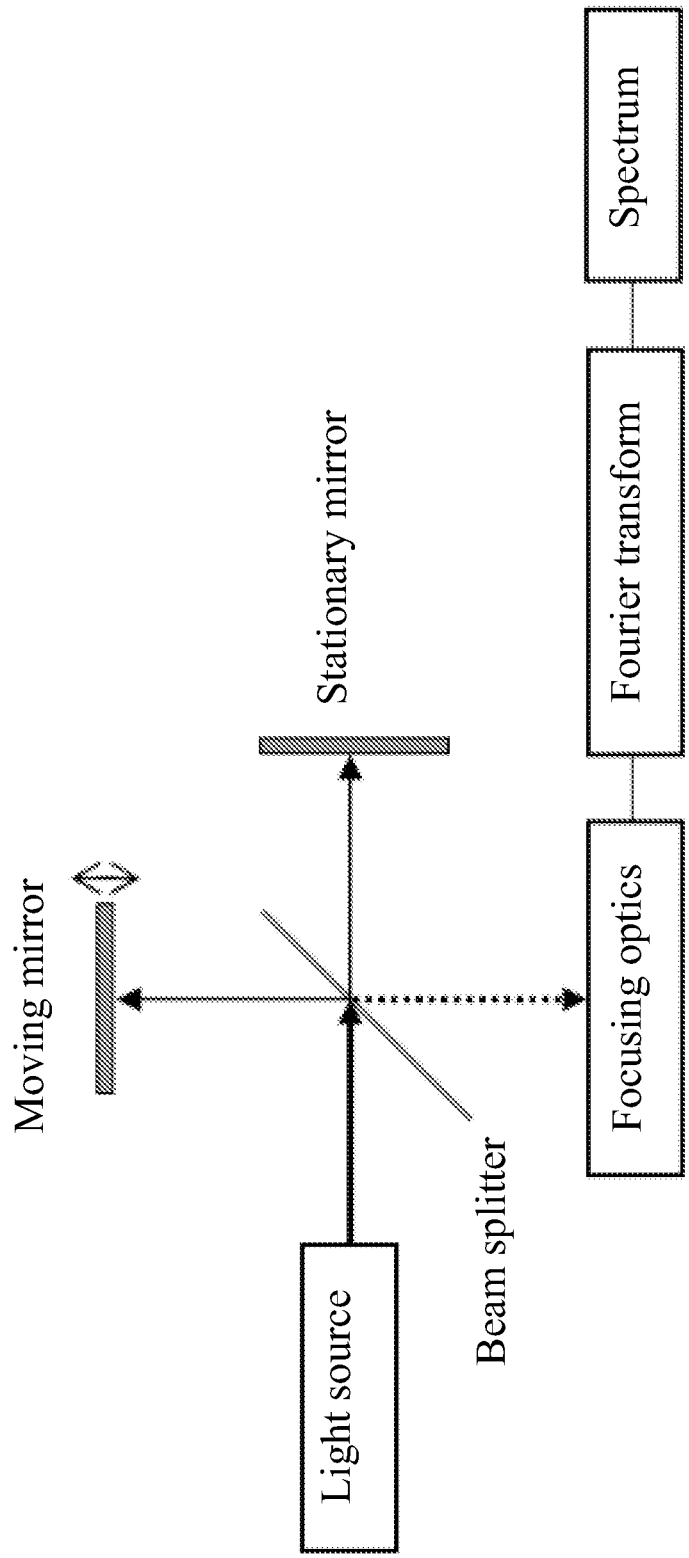
FIG. 1 shows a schematic of a Fourier-transform spectrometer (adapted from: Saptari, Vidi, Fourier-Transform Spectroscopy Instrumentation Engineering. SPIE Press, Bellingham Wash., Vol. No.: TT61 (2004), herein incorporated by reference in its entirety).

When used to compare two or more voltages, currents, or other values, the term "equal," indicates that the voltages or currents are substantially identical, or identical within reasonable error associated with the circuitry or system. Such reasonable errors are understood by those in the art, and may be, for example <5% error, <2% error, <1% error, <0.1% error, <0.01% error, <0.001% error, <0.0001% error, or less, depending upon the particular utility. A skilled artisan is capable of determining such limits. The values need not be precisely identical; however, values which are merely similar or approximate do not satisfy the criteria of being "equal."

As used herein, the terms "actuator" and "motor" are used synonymously.

As used herein, the terms "top of the actuator" and "terminal α" are used synonymously.

As used herein, the terms "bottom of the actuator" and "terminal β" are used synonymously.

DETAILED DESCRIPTION OF EMBODIMENTS

Provided herein are devices, systems, computer-executable instructions, and methods for electrically-augmented damping of an actuator and associated devices. Example actuators include, but are not limited to, voice-coil actuators. In some embodiments, methods for increased effective damping without the use of a dedicated velocity sensor are provided. In some embodiments, a rate signal is developed (e.g., for use in damping) without input from a dedicated velocity sensor. In some embodiments, electrically-augmented damping derived from measurement of voltage across an actuator and current flowing through an actuator is provided. In particular, a rate signal is developed, for use in damping, from measurements of the voltage appearing between the two terminals of the voice-coil actuator and the current flowing through the actuator. Embodiments are described in which a dedicated velocity sensor is not used, thereby reducing cost and volume of the system.

Provided herein are methods for providing a compensation voltage for electrically-augmented damping of any suitable system. In some embodiments, the compensation voltage is calculated, determined, and/or derived from currents and voltages within the system. In some embodiments, currents and voltages within the system are manipulated in any suitable manner to provide a compensation voltage (e.g., rate feedback) to damp the system. In some embodiments, a compensation voltage is provided by rate feedback circuitry or compensation circuitry. In some embodiments, a compensation voltage or rate-feedback signal is provided without additional devices or apparatuses (e.g., velocity sensors). In some embodiments, a compensation voltage or rate-feedback signal is provided without additional devices or apparatuses (e.g., velocity sensors) other than compensation circuitry to obtain, divert, and manipulate currents and voltages within the existing circuitry.

Provided herein are devices, systems, and methods for electrically-augmented damping of actuators which find use in any suitable device, system, or apparatus. In embodiments, a computing device executing a program of instructions may be utilized to perform the relevant calculation in order to control the system and/or perform the method. As is to be appreciated, the instructions may be embodied in a variety of media, including, but not limited to, tangible media such as hard drives, memory (e.g., random access memory, read only memory, magnetic and optic media and so forth. In some embodiments, voice-coil actuators find use in, for example, Fourier-transform spectrometers (e.g., FT infrared spectrometers), hard disk drives, loudspeakers, shaker tables, lens focusing, medical equipment, laser-cutting tools, etc. In some embodiments, an actuator utilizing the damping described herein is an element in an optical path-length modulator mechanism of a Fourier-transform spectrometer. In some embodiments, Fourier-transform spectrometers comprising an optical path-length modulator mechanism employing electrically-augmented damping are provided. In some embodiments, increased effective damping results in noise reduction or increased precision for devices and systems utilizing systems and methods described herein. In particular, increased effective damping in the optical path-length modulator mechanism of a Fourier-transform spectrometer results in a reduction in errors in time-domain interferograms. These errors may translate into errors (e.g., comparatively larger errors) in the frequency-domain spectrum; hence, reducing such errors may results in improved spectrometer performance while minimizing the overall "footprint" of such a device. Similar performance enhancements are realized in other devices and systems utilizing the damping methods and systems described herein.

In some embodiments, electronically-augmented damping actuators (e.g., non-linear actuators, voice-coil actuators, rotational actuators, etc.) are provided. In some embodiments, a voice-coil actuator is provided. In some embodiments, a voice-coil actuator is provided for use in a Fourier-transform spectrometer, loudspeaker, hard disk drive, shaker tables, lens focusing, medical equipment, laser-cutting tools, etc. In some embodiments, a voice-coil actuator is employed in an optical path-length modulator mechanism of a Fourier-transform spectrometer (e.g., providing movement of the "moving mirror"). In some embodiments, a voice-coil actuator is an electromagnetic device that produces accurately controllable forces over a limited stroke with a single coil or phase (Goque & Stepak, Voice-coil actuators, G2 Consulting, Beaverton, Oreg., herein incorporated by reference in its entirety). In embodiments, a voice-coil actuator is a linear actuator. In some embodiments, a voice-coil actuator is a swing-arm actuator or rotation actuator, and is used to rotate a load through an angle. In some embodiments, a voice-coil actuator is capable of accelerations greater than 10 times gravitational acceleration (e.g., >10 g . . . 15 g . . . 20 g . . . 25 g . . . 30 g . . . 40 g . . . 50 g, etc.). In some embodiments, a voice-coil actuator is capable of precise positioning (e.g., error of less than one hundred thousandth of an inch (e.g., <0.00001, <0.000001, <0.0000001, <0.00000001, etc.). In some embodiments, a voice-coil actuator has a settling time, e.g., the time required for structural vibration to settle down to below the measurement threshold after a high-acceleration move, of less than 10 milliseconds (e.g., <10 ms, <5 ms, <2 ms, <1 ms, <0.5 ms, <0.1 ms, <0.01 ms, etc.). A voice-coil actuator functions based on the principle that if a conductor (e.g., wire) carrying electric current passes through a magnetic field, a force is generated on the conductor orthogonal to both the direction of the current and the magnetic flux. Likewise, if a current is passed through a conductor which lies between two poles of a magnetic field, a force will be generated on the conductor orthogonal to both the direction of the current and the magnetic flux. The ratio of generated force to current may be referred to as the "force constant". The generated force varies as a function of the amount of current, direction of current, coil speed, coil position, rate of change of the current, strength of magnetic field, etc. Once the conductor (e.g., armature) begins to move as a result of the generated force, a voltage is induced in the conductor, caused by its motion in a magnetic field. This voltage, called back electromotive force (EMF), is proportional to speed, field strength and current, and is in a direction to oppose motion. It reduces the voltage across the coil, lowering the current and the rate of acceleration.

In some embodiments, a voice-coil actuator comprises a permanent magnet, and an armature that carries a current through the magnetic field of the permanent magnet. In some embodiments, a command voltage is applied to the voice-coil actuator. In some embodiments, a force is induced on the armature due to the flow of current through the magnetic field. In some embodiments, back EMF is produced by movement of the armature, hereby reducing the voltage across the voice-coil. In some embodiments, systems and methods are provided to compensate for the voltage caused by the movement of the armature. In some embodiments, methods and systems herein serve to alter the effective command voltage applied to a voice-coil actuator to compensate for undesired inputs (e.g., voltage caused by armature movement, noise, fluctuations, etc.). In some embodiments, a compensation voltage is applied to the command voltage. In some embodiments, a compensation voltage is a rate signal. In some embodiments, a compensation voltage is analogous to a rate signal. In some embodiments, a compensation voltage is derived from a rate signal. In some embodiments, an effective command voltage is produced by applying a compensation voltage to a command voltage. In some embodiments, a voltage analogous to the armature rate (e.g., compensation voltage) is removed from the command voltage applied to the voice-coil actuator. In some embodiments, a voltage analogous to the armature rate (e.g., compensation voltage) is removed from the command voltage to yield an effective command voltage. In some embodiments, a rate signal is developed, for use in damping, from measurements of the voltage appearing between the two terminals of the conductor the voice-coil actuator and the current flowing through the actuator. In some embodiments, a compensation voltage is derived from the voltage across the voice-coil actuator and the current flowing through the actuator. In some embodiments, a compensation voltage is derived from summing the voltage appearing at the top of the actuator and a voltage equal to the inverse of the component of voltage appearing at the top of the actuator produced by the flow of current through the actuator.

Figure 2:
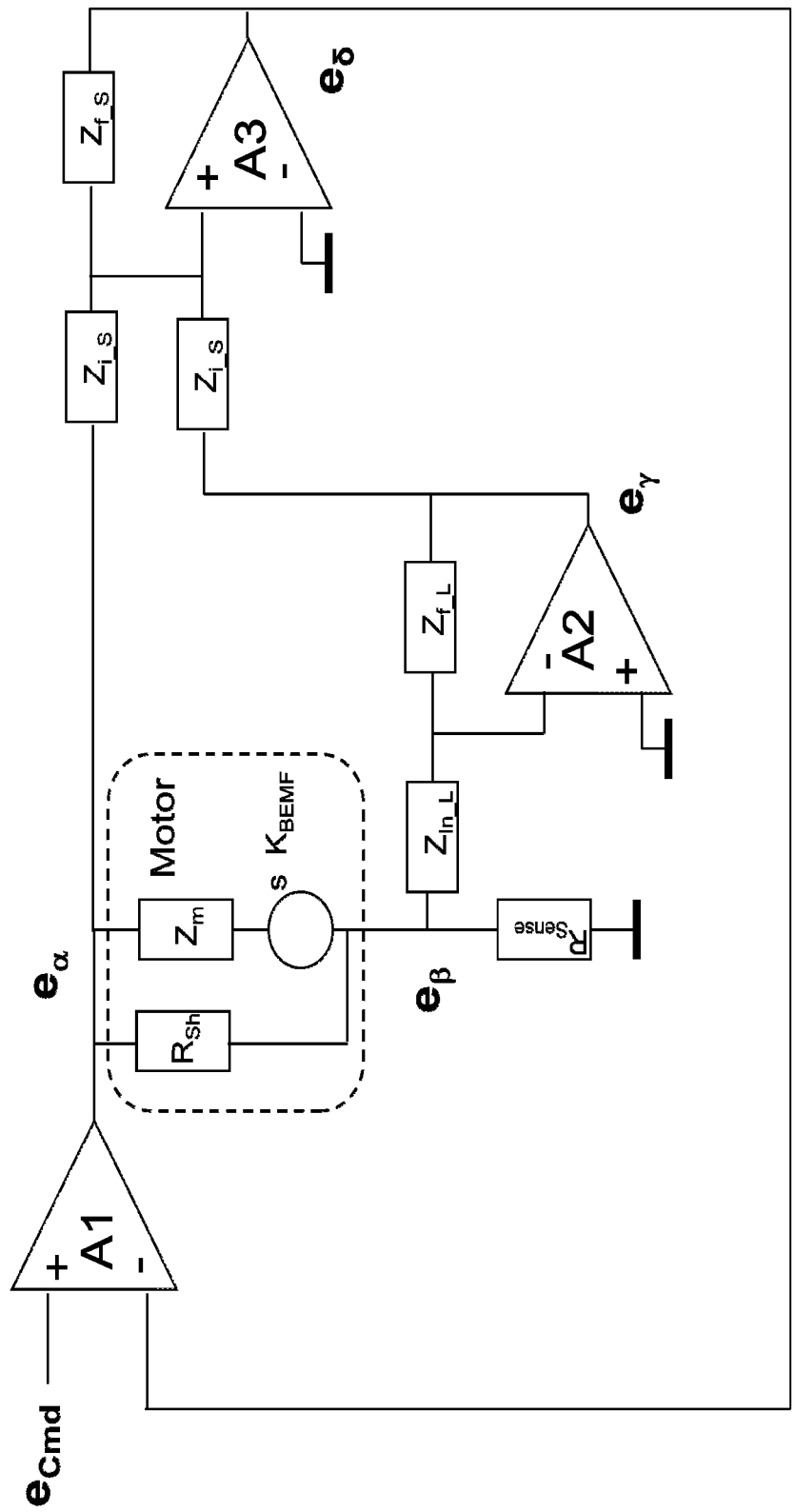
FIG. 2 shows a circuit schematic employed in embodiments in accordance with the present disclosure.

FIG. 2 provides a schematic representing exemplary circuitry for applying the methods provided herein. In some embodiments, a series of amplifiers and/or circuits are employed to obtain a compensation voltage to correct the command voltage producing an effective command voltage.

Figure 5:
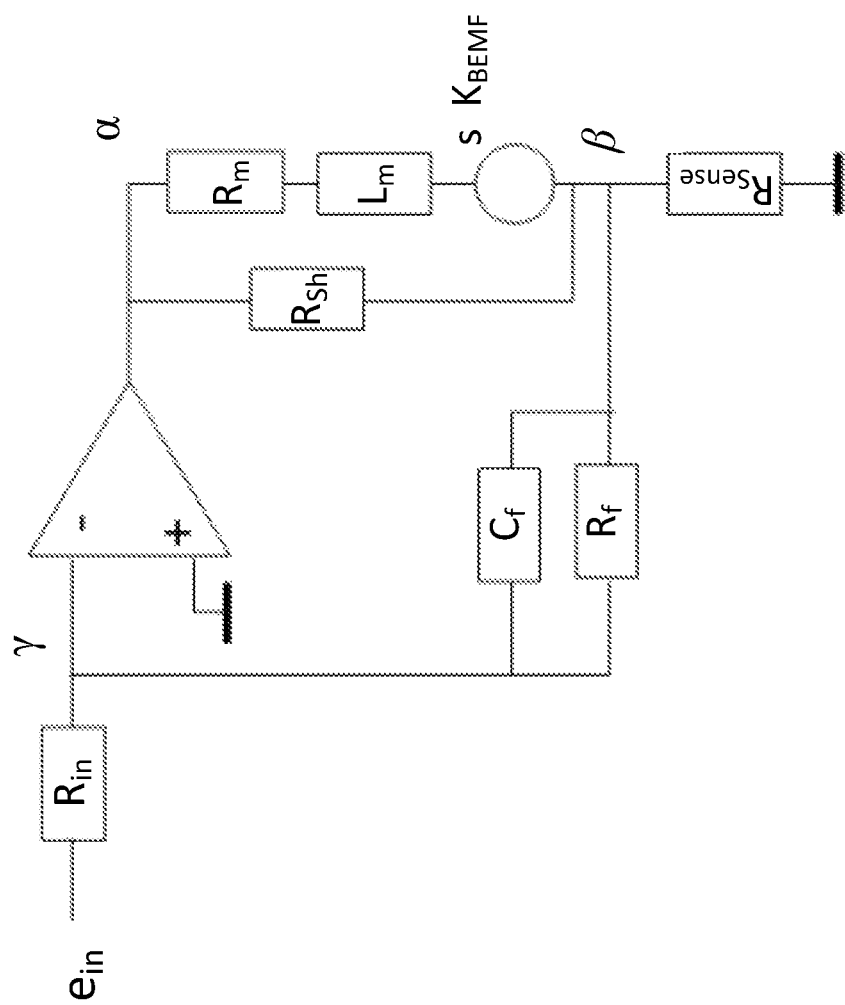
FIG. 5 shows a schematic of a circuit sub-component employed in additional embodiments.

Amplifier A1 is a transconductance ($G_m$) amplifier (SEE FIG. 2). In some embodiments, the transconductance amplifier A1 is configured according to the circuit synthesis outlined in FIG. 5. Other suitable transconductance amplifier circuitry can be employed as well. The output of transconductance amplifier A1 is a current which is a function of: (1) the command voltage $e_{Cmd}$ and (2) the compensation voltage or rate-feedback voltage $e_\delta$. In some embodiments, the output of transconductance amplifier A1 is a current which is a function of the sum of the command voltage and the compensation voltage.

In some embodiments, the output current produced by transconductance amplifier A1 flows into the actuator, dividing between the motor electrical impedance $Z_m$ and the shunt resistance $R_{Sh}$ (SEE FIG. 2). In some embodiments, the total current from the $Z_m$ and $R_{Sh}$ then flows through Sense Resistance $R_{Sense}$. The voltage generator depicted in the motor model of FIG. 2 represents the voltage produced by the motion of the armature through the magnetic field associated with the permanent magnet. The magnitude of this voltage is given by the product of the angular velocity of the armature ($\Theta$-dot) and the Back-EMF constant of the motor ($K_{BEMF}$). This generator is represented in the complex-frequency domain model with amplitude $s*\Theta*K_{BEMF}$. The voltage appearing at the top of the motor $e_\alpha$ contains (1) a component due to the flow of current through the motor impedances $e_{\alpha 1}$, and (2) a component due to armature motion $e_{\alpha 2}$. The voltage appearing at the bottom of the motor $e_\beta$ is a function of current flowing through the actuator (e.g., no component due to armature movement). Other motors, generators, and actuators that produce voltages according to other schemes are provided herein. For example, other suitable motors are used in place of the one described in FIG. 2. Changes to the circuitry can be used to adapt to different motor setups.

Figure 8:
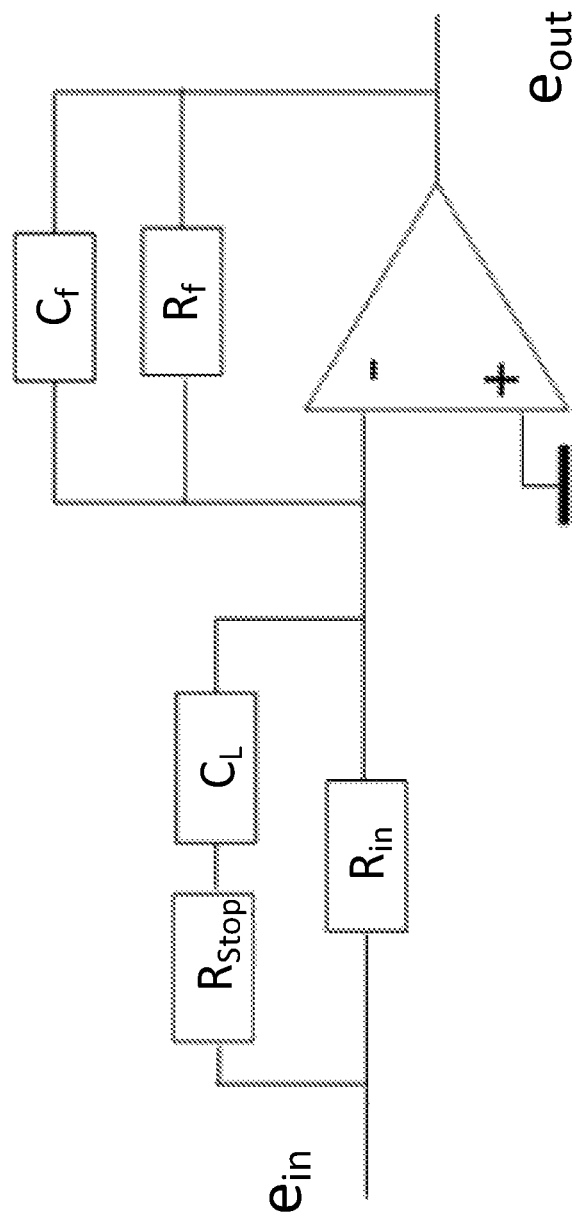
FIG. 8 shows a schematic of a circuit sub-component employed in additional embodiments.

The lead amplifier A2 may scale the voltage observed at the bottom of the motor $e_\beta$ such that the output of the lead amplifier A2 is substantially identical to that component of the voltage appearing at the top of the motor which is due to motor current (SEE FIG. 2). The lead amplifier A2 can be configured according to the circuit synthesis outlined in FIG. 8. In some embodiments, the transfer function of lead amplifier A2 scales the voltage $e_\beta$ such that lead amplifier A2 output $e_\gamma$ is equal to the component of $e_\alpha$ produced by the flow of current through the motor impedances. In this way the lead amplifier A2 can invert the phase of the current. In some embodiments, lead amplifier A2 introduces a phase shift of 180 degrees, thereby inverting the phase of the current.

Figure 11:
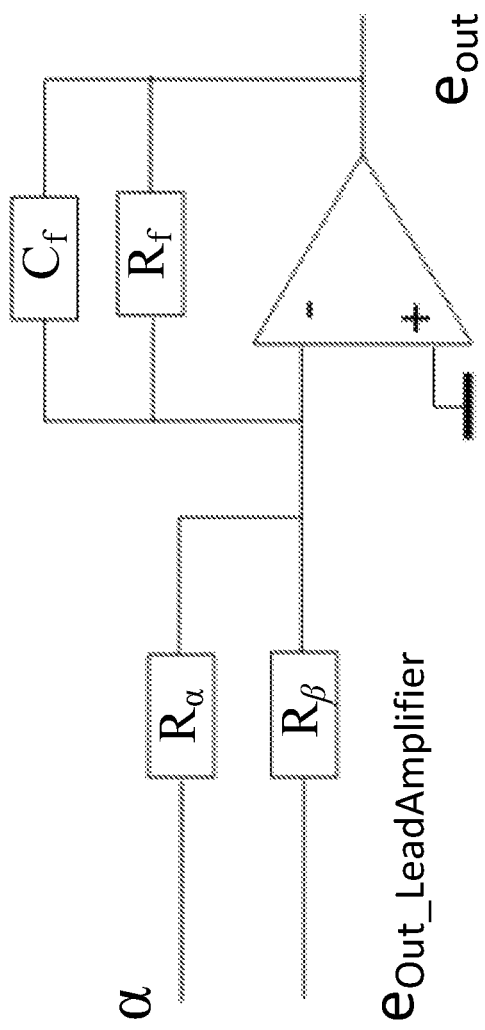
FIG. 11 shows a schematic of a Summing Amplifier circuit sub-component employed in some embodiments.

In some embodiments, the rate summer amplifier A3 adds voltages $e_\gamma$ and $e_\alpha$ (SEE FIG. 2), due to the inversion produced by lead amplifier A2. This results in a subtraction. In some embodiments, the voltage at the output of rate summer amplifier A3 is the compensation voltage $e_\delta$, which is equal to the motional voltage $s*\Theta*K_{BEMF}$ scaled by the gain of rate summer amplifier A3. The rate summer amplifier A3 may be configured according to the circuit synthesis outlined in FIG. 11. The output of the rate summer amplifier A3 represents only the motional voltage produced by armature motion, the effects of motor current having cancelled in the subtraction.

Thus, the compensation voltage $e_\delta$ is analogous to the velocity at the motor armature, $\Theta$-dot.

In some embodiments, the compensation voltage $e_\delta$ is subtracted from the command voltage applied to transconductance amplifier A1 to yield an effective command voltage (SEE FIG. 2). As $e_\delta$ is analogous to armature rate, the compensation (e.g., voltage subtraction) augments the damping inherent in the physical mechanism. In some embodiments, the voltage compensation at transconductance amplifier A1 accounts for voltage effects of the movement of the armature through the magnetic field.

The circuitry and/or amplifier connectivity described above should not be viewed as limiting. Additional embodiments, although not explicitly described herein are contemplated based on design preference and can be used with the described embodiments.

Certain embodiments, including sample algorithms, are described below to illustrate use in the context of a Fourier-transform spectrometry instrument. These embodiments are provided for illustrative purposes only and should not be considered limiting.

Example 1

Transfer Function of an Uncompensated System

The armature assembly and its flexure suspension form a lightly-damped second-order rotational system. A torque balance at the armature yields the following:

$$Torque_{Armature} = s^2 \cdot \Theta \cdot J_{Armature} + s \cdot \Theta \cdot K_{Damping} + \Theta \cdot K_{Spring}$$

$$\Rightarrow Torque_{Armature} = \Theta \cdot J_{Armature} \cdot \left( s^2 \cdot s \cdot \frac{K_{Damping}}{J_{Armature}} + \frac{K_{Spring}}{J_{Armature}} \right)$$

Solving for armature angle $\Theta$:

$$\Theta = \left( \frac{Torque_{Armature}}{J_{Armature}} \right) \cdot \left( \frac{1}{s^2 \cdot s \cdot \frac{K_{Damping}}{J_{Armature}} + \frac{K_{Spring}}{J_{Armature}}} \right)$$

The torque developed by the actuator is related to the current by the TorqueConstant$_{Actuator}$:

$$Torque_{Armature} = ActuatorCurrent \cdot TorqueConstant_{Actuator}$$

Therefore:

$$\Theta = \left( \frac{ActuatorCurrent \cdot TorqueConstant_{Actuator}}{J_{Armature}} \right) \cdot \left[ \frac{1}{s^2 + s \cdot \left( \frac{K_{Damping}}{J_{Armature}} \right) + \frac{K_{Spring}}{J_{Armature}}} \right]$$

$K_{UncompensatedPlant}$ was expressed as:

$$K_{UncompensatedPlant} = \frac{\Theta}{ActuatorCurrent}$$

Therefore:

$$K_{UncompensatedPlant} = \left(\frac{TorqueConstant_{Actuator}}{J_{Armature}}\right) \cdot \left[\frac{1}{s^2 + s \cdot \left(\frac{K_{Damping}}{J_{Armature}}\right) + \frac{K_{Spring}}{J_{Armature}}}\right]$$

$$\omega_{n\_UncompensatedPlant} = \sqrt{\frac{K_{Spring}}{J_{Armature}}}$$

$$2 \cdot \zeta_{UncompensatedPlant} \cdot \omega_n = \frac{K_{Damping}}{J_{Armature}} \Rightarrow \zeta_{UncompensatedPlant} = \frac{K_{Damping}}{2} \cdot \sqrt{\frac{1}{K_{Spring} \cdot J_{Armature}}}$$

Example 2

Developing Transfer Functions for Servo Components

Transfer functions were developed to define the forward branch of the compensated plant loop:

$$ForwardGain_{CompensatedPlant} = \frac{\Theta_{Armature}}{e_{Out\_ErrorAmp}}$$

$$\Theta_{Armature} = e_{Out\_ErrorAmp} \cdot Gm \cdot K_{UncompensatedPlant}$$

Therefore:

$$ForewardGain_{CompensatedPlant} = Gm \cdot K_{UncompensatedPlant}$$

The transconductance (Gm) amplifier was expressed as:

$$Gm = \frac{i_{Motor}}{e_{Out\_ErrorAmp}}$$

Therefore:

$$ForwardGain_{CompensatedPlant} = Gm \cdot K_{UncompensatedPlant}$$

$$ForwardGain_{CompensatedPlant} = Gm \cdot \left[\left(\frac{TorqueConstant_{Actuator}}{J_{Armature}}\right) \cdot \left[\frac{1}{s^2 + s \cdot \left(\frac{K_{Damping}}{J_{Armature}}\right) + \frac{K_{Spring}}{J_{Armature}}}\right]\right]$$

Transfer functions were developed to express the feedback branch of the compensated plant loop:

$$FeedbackGain_{CompensatedPlant} = \frac{e_{RateSummer\_Out}}{\frac{d}{dt}\Theta_{Armature}}$$

$e_{RateSummer\_Out}$ represents the angular rate at the armature.

The feedback variable $e_{RateSummer\_Out}$ is synthesized from voltages observed at the Top and the Bottom of the actuator. The voltage at the Bottom of the actuator coil is a function of the motor current given by:

$$e_{MotorBottom} = i_{Motor} \cdot R_{Sense}$$

The voltage appearing at the top of the motor due to current from the Gm amplifier is:

$$e_{MotorTop\_GmAmplifierCurrent} = i_{Motor} \cdot (R_{Motor} + s \cdot L_{Motor} + R_{Sense})$$

In addition to the above voltage, the back EMF constant of the motor generates a voltage proportional to armature motion:

$$e_{MotorTop\_BEMF} = \left(\frac{d}{dt}\Theta_{Armature}\right) \cdot K_{BEMF}$$

The two voltages add yielding a voltage at the top of the motor given by:

$$e_{MotorTop} = i_{Motor} \cdot (R_{Motor} + s \cdot L_{Motor} + R_{Sense}) + \left(\frac{d}{dt}\Theta_{Armature}\right) \cdot K_{BEMF}$$

The Lead Amplifier scales the voltage observed at the Motor Bottom such that the output of the Lead Amplifier is identical to that component of the voltage appearing at the Motor Top which is due to motor Current. The Rate Summer amplifier subtracts the output of the Lead Amplifier from the voltage appearing at the Motor Top. The output of the Rate Summer represents only the motional voltage produced by armature motion, the effects of motor current having cancelled in the subtraction. A transfer function for the lead amplifier was developed which satisfies the restraints and requirements of the system. For the effects of motor current to cancel at the Rate Summer, the transfer function of the Lead Amplifier must satisfy the expression:

$$(e_{MotorBottom} \cdot TransferFunction_{LeadAmplifier} = -e_{MotorTop\_LockedArmature})$$

Therefore:

$$TransferFunction_{LeadAmplifier} = -1 \cdot \frac{i_{Motor} \cdot (R_{Motor} + s \cdot L_{Motor} + R_{Sense}) + (0) \cdot K_{BEMF}}{i_{Motor} \cdot R_{Sense}}$$

$$TransferFunction_{LeadAmplifier} = -1 \cdot \frac{R_{Motor} + s \cdot L_{Motor} + R_{Sense}}{R_{Sense}}$$

$$TransferFunction_{LeadAmp} = Gain_{LeadAmp\_0} \cdot (s \cdot \tau_{LeadAmp\_Zero\_0} + 1)$$

When:

$$Gain_{LeadAmp\_0} = -1 \cdot \frac{R_{Sense} + R_{Motor}}{R_{Sense}} \quad \tau_{LeadAmp\_Zero\_0} = \frac{L_{Motor}}{R_{Sense} + R_{Motor}}$$

The Rate Summer subtracts the Lead Amplifier output from the voltage present at the Motor Top, yielding a signal which is a function of Armature position alone. The Rate Summer scales this signal by the factor $K_{RateSummer}$. The output of the Rate Summer is:

$$e_{RateSummerOut} = (e_{MotorTop} + e_{LeadAmplifierOut}) \cdot K_{RateSummer}$$

Substituting the previous expressions for eMotorTop, eMotorBottom, and the Lead Amplifier Transfer Function, the output of the Rate Summer becomes:

$$e_{RateSummerOut} =$$

$$\begin{bmatrix} [i_{Motor} \cdot (R_{Motor} + s \cdot L_{Motor} + R_{Sense}) + (s \cdot \Theta_{Armature}) \cdot K_{BEMF}] \ldots + \\ (i_{Motor} \cdot R_{Sense}) \cdot \left(-1 \cdot \frac{R_{Sense} + R_{Motor}}{R_{Sense}}\right) \cdot \left(s \cdot \frac{L_{Motor}}{R_{Sense} + R_{Motor}} + 1\right) \end{bmatrix} \cdot$$

$$K_{RateSummer}$$

$$e_{RateSummerOut} = K_{RateSummer} \cdot s \cdot \Theta_{Armature} \cdot K_{BEMF} \Longleftarrow \text{units are} \left(\frac{\text{Volt}}{\text{Radians}_{Mechanical}}\right)$$

A transfer function was developed for an error amplifier:

$$e_{ErrorAmplifier\_Out} = (e_{Command} - e_{RateSummer\_Out}) \cdot Gain_{ErrorAmplifier}$$

where $\Longrightarrow Gain_{ErrorAmplifier} := 1 \cdot \frac{\text{volt}}{\text{volt}}$ Transfer function for the Open-Loop Gain of the compensated loop was determined:

$$LoopGain_{CompensatedPlant} = ForwardGain_{CompensatedPlant} \cdot FeedbackGain_{CompensatedPlant} \cdot Gain_{ErrorAmplifier}$$

$$LoopGain_{CompensatedPlant} =$$

$$\left[Gm \cdot \left[\left(\frac{TorqueConstant_{Actuator}}{J_{Armature}}\right) \cdot \left[\frac{1}{s^2 + s \cdot \left(\frac{K_{Damping}}{J_{Armature}}\right) + \frac{K_{Spring}}{J_{Armature}}}\right]\right]\right] \cdot$$

$$(s \cdot K_{BEMF} \cdot K_{RateSummer}) \cdot Gain_{ErrorAmplifier}$$

Transfer function for the Closed-Loop Gain of the compensated loop was determined:

$$ClosedLoopGain_{CompensatedPlant} = \frac{ForwardGain_{CompensatedPlant}}{1 + LoopGain_{CompensatedPlant}}$$

$$ClosedLoopGain_{CompensatedPlant} = \left(\frac{TorqueConstant_{Actuator} \cdot Gm}{J_{Armature}}\right) \cdot$$

$$\frac{1}{s^2 + s \cdot \left(\frac{K_{Damping} + Gm \cdot TorqueConstant_{Actuator} \cdot K_{BEMF} \cdot K_{RateSummer} \cdot Gain_B}{J_{Armature}}\right)}$$

$$ClosedLoopGain_{CompensatedPlant} = \left(\frac{TorqueConstant_{Actuator} \cdot Gm}{J_{Armature}}\right) \cdot$$

$$\frac{1}{s^2 + s \cdot (2 \cdot \xi_{CompensatedPlant} \cdot \omega_{n\_CompensatedPlant}) + \omega_{n\_CompensatedPlant}^2}$$

The resonant frequencies of the compensated and uncompensated plants are substantially identical (e.g. identical):

$$\omega_{n\_CompensatedPlant} = \sqrt{\frac{K_{Spring}}{J_{Armature}}}$$

-continued $$2 \cdot \zeta_{CompensatedPlant} \cdot \omega_n = \frac{K_{Damping} + Gm \cdot TorqueConstant_{Actuator} \cdot \frac{K_{BEMF} \cdot K_{RateSummer} \cdot Gain_{ErrorAmplifier}}{J_{Armature}}}{J_{Armature}}$$

$$\zeta_{CompensatedPlant} =$$

$$\frac{K_{Damping} + Gm \cdot TorqueConstant_{Actuator} \cdot \frac{K_{BEMF} \cdot K_{RateSummer} \cdot Gain_{ErrorAmplifier}}{2}}{2} \cdot \sqrt{\frac{1}{K_{Spring} \cdot J_{Armature}}}$$

$$\zeta_{UncompensatedPlant} = \frac{K_{Damping}}{2} \cdot \sqrt{\frac{1}{K_{Spring} \cdot J_{Armature}}}$$

The damping of the Compensated Plant is the sum of two terms: the damping in the Uncompensated Plant (which may be inherent), plus a term determined by the loop gain:

$$\zeta_{CompensatedPlant} = \zeta_{UncompensatedPlant} =$$

$$\frac{Gm \cdot TorqueConstant_{Actuator} \cdot K_{BEMF} \cdot \frac{K_{RateSummer} \cdot Gain_{ErrorAmplifier}}{2}}{2} \cdot \sqrt{\frac{1}{K_{Spring} \cdot J_{Armature}}}$$

Example 3

Selection of Circuit Parameters to Achieve Performance Metrics

Circuit values were chosen to produce a closed-loop gain meeting the following performance metrics which were deemed suitable for an instrument (e.g. Fourier-transform spectrometry instrument):

$$ClosedLoopGain_{0\_CompensatedPlant} :=$$

$$\frac{4.03049}{3} \cdot \frac{deg}{volt} \Longrightarrow ClosedLoopGain_{0\_CompensatedPlant} = 1.343 \frac{deg}{volt}$$

$$\zeta_{CompensatedPlant} := 0.9$$

$$\omega_{n\_CompensatedPlant} = \omega_{n\_UncompensatedPlant}$$

$$\Theta_{Armature\_Max} := 4.03049 \cdot deg$$

$$\Theta_{Armature\_Min} := -4.03049 \cdot deg$$

Observed uncompensated plant performance using the above circuit values:

$$\omega_{n\_UncompensatedPlant} := 235.3 \cdot \frac{rad}{sec}$$

$$SpringConstant_{Flexure\_1} := \frac{0.0296 \cdot lbf \cdot in}{deg}$$

$$SpringConstant_{Flexure\_2} := \frac{0.0004 \cdot lbf \cdot in}{deg}$$

$$\zeta_{UncompensatedPlant} := 0.0239$$

$$K_{Spring} := (SpringConstant_{Flexure\_1} + SpringConstant_{Flexure\_2}) \Longrightarrow K_{Spring} =$$

-continued $$\omega_n^2 = \sqrt{\frac{K_{Spring}}{J_{Armature}}} \Rightarrow J_{Armature} := \frac{3.39 \times 10^{-3} \frac{N \cdot m}{deg}}{\omega_{n\_UncompensatedPlant}^2}$$

$$\frac{K_{Spring}}{\omega_{n\_UncompensatedPlant}^2} \Rightarrow J_{Armature} = 3.508 \times 10^{-6} \text{ kg} \cdot m^2$$

Observed actuator parameters using the above circuit values:

$$L_{Motor} := 6.019 \cdot mH$$
$$R_{Motor} := 30.0 \cdot ohm$$
$$TorqueConstant_{Actuator} := 0.1649 \cdot \frac{N \cdot m}{amp}$$
$$K_{BEMF} := 0.748 \cdot \frac{volt}{\frac{Rad}{sec}}$$
$$Radius_{MirrorArm} := 0.4 \cdot in$$
$$K_{\Theta\_To\_OPD} := 4 \cdot Radius_{MirrorArm}$$

$G_m$ required to satisfy Closed-Loop gain requirement:

$$ClosedLoopGain_{CompensatedPlant} = \left(\frac{TorqueConstant_{Actuator} \cdot Gm_0}{J_{Armature}}\right) \cdot \frac{1}{s^2 \cdot s \cdot \left(\frac{K_{Damping} + Gm_0 \cdot TorqueConstant_{Actuator} \cdot K_{BEMF} \cdot K_{RateSummer} \cdot G}{J_{Armature}}\right)}$$

Therefore, at frequency=0:

$$ClosedLoopGain_{0\_CompensatedPlant} = \left(\frac{TorqueConstant_{Actuator} \cdot Gm_0}{K_{Spring}}\right)$$

Setting this equal to the desired value of Closed Loop Gain, and solving for the required value of $G_m$:

$$Gm_{0\_Required} := \frac{ClosedLoopGain_{0\_CompensatedPlant}}{TorqueConstant_{Actuator}} \cdot K_{Spring} \Rightarrow Gm_{0\_Required} = 27.616 \frac{mAmp}{volt}$$

Rate-Summer gain required to yield desired damping:

$$\zeta_{CompensatedPlant} = \zeta_{UncompensatedPlant} + \frac{Gm_0 \cdot TorqueConstant_{Actuator} \cdot K_{BEMF} \cdot K_{RateSummer} \cdot Gain_{ErrorAmplifier}}{2} \cdot \sqrt{\frac{1}{K_{Spring} \cdot J_{Armature}}}$$

Setting this equal to the desired value of damping, and solving for the required value of Rate Summer Gain:

$$\zeta_{CompensatedPlant\_Desired} = \zeta_{UncompensatedPlant} + \frac{Gm_0 \cdot TorqueConstant_{Actuator} \cdot K_{BEMF} \cdot K_{RateSummer} \cdot Gain_{ErrorAmplifier}}{2} \cdot \sqrt{\frac{1}{K_{Spring} \cdot J_{Armature}}}$$

$$K_{RateSummer\_Required} := \frac{2 \cdot \frac{\zeta_{CompensatedPlant} - \zeta_{UncompensatedPlant}}{\left(\frac{1}{K_{Spring} \cdot J_{Armature}}\right)^{\frac{1}{2}} \cdot Gm_{0\_Required} \cdot TorqueConstant_{Actuator} \cdot K_{BEMF} \cdot Gain_{ErrorAmplifier}}}{}$$

$$K_{RateSummer\_Required} = 0.425$$

Example 4

Evaluation of Servo Transfer Functions

Compensated plant transfer functions were evaluated using the parameters determined in example 3.

Figure 3:
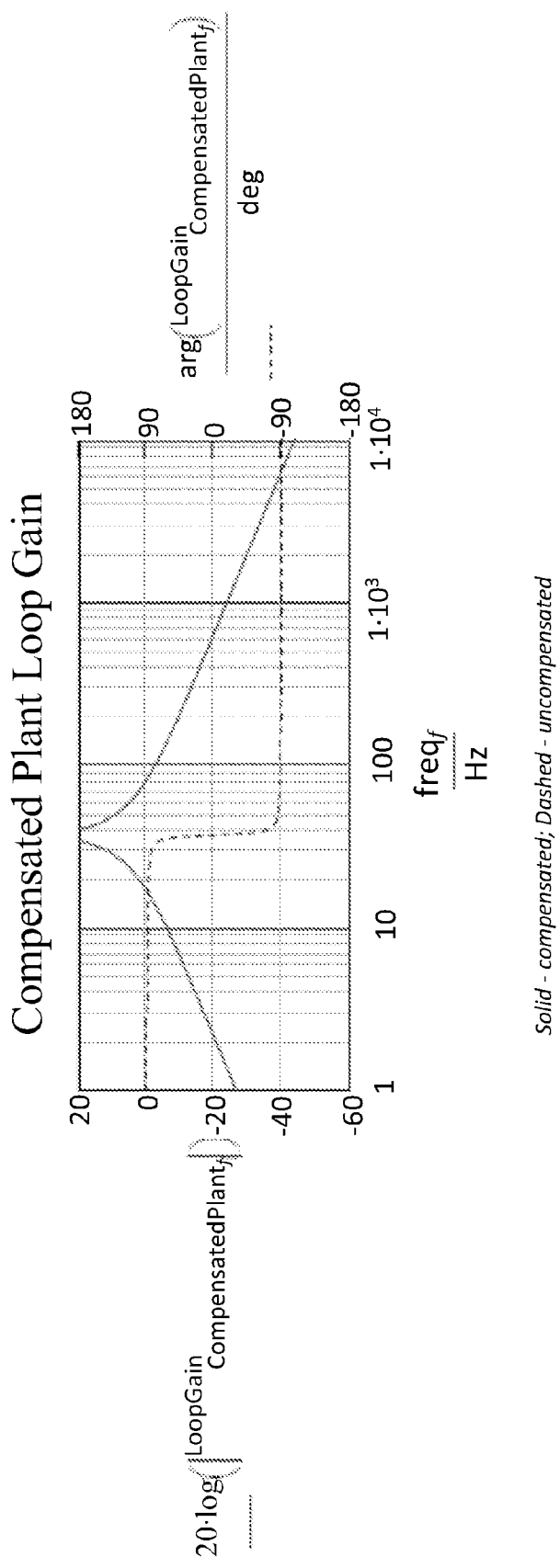
FIG. 3 shows a sample plot of compensated plant loop gain.

Open-Loop transfer function (SEE FIG. 3):

$$\zeta_{UncompensatedPlant} = \frac{K_{Damping}}{2} \cdot \sqrt{\frac{1}{K_{Spring} \cdot J_{Armature}}}$$

$$K_{Damping} := \frac{2 \cdot \zeta_{UncompensatedPlant}}{\sqrt{\frac{1}{K_{Spring} \cdot J_{Armature}}}} \Rightarrow K_{Damping} = 3.945 \times 10^{-5} \frac{N \cdot m}{\frac{rad}{sec}}$$

$$LoopGain_{CompensatedPlant_f} := \left[Gm_{0\_Required} \cdot \left(\frac{TorqueConstant_{Actuator}}{J_{Armature}}\right) \cdot \left[\frac{1}{(s_f)^2 + s_f \cdot \left(\frac{K_{Damping}}{J_{Armature}}\right) + \frac{K_{Spring}}{J_{Armature}}}\right]\right] \cdot (s_f \cdot K_{BEMF} \cdot K_{RateSummer\_Re}$$

Figure 4:
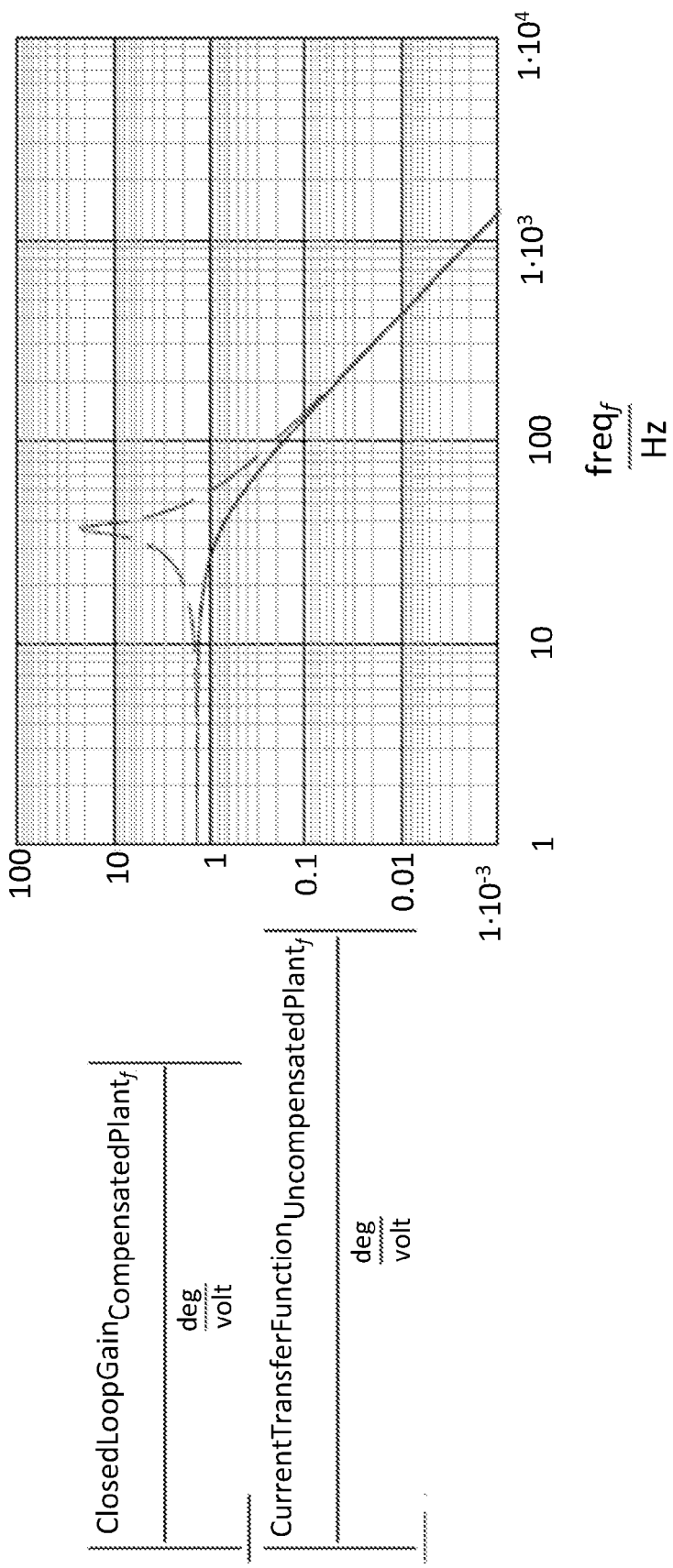
FIG. 4 shows a sample plot of compensated plant closed-loop gain.

Closed-Loop transfer function (SEE FIG. 4):

$$ClosedLoopGain_{CompensatedPlant_f} := \left(\frac{TorqueConstant_{Actuator} \cdot Gm_{0\_Required}}{J_{Armature}}\right) \cdot \frac{1}{(s_f)^2 + s_f \cdot \left(\frac{K_{Dramping} + Gm_{0\_Required} \cdot TorqueConstant_{Actuator} \cdot K}{J_{Arma}}\right)}$$

$$CurrentTransferFunction_{UncompensatedPlantf} := Gm_{0\_Required} \cdot \left[\left(\frac{TorqueConstant_{Actuator}}{J_{Armature}}\right) \cdot \left[\frac{1}{(s_f)^2 + s_f \left(2 \cdot \zeta_{UncompensatedPlant} \cdot \sqrt{\frac{K_{Spring}}{J_{Armature}}}\right) + \frac{1}{J_j}}\right]\right]$$

Example 5

Circuit Synthesis

Circuits were developed to meet the performance requirements for the amplifiers.

A. Gm Amplifier Circuit Synthesis (SEE FIG. 5):
   Driving Requirements:

$$Gm_{0\_Required} = 27.616 \frac{mAmp}{volt}$$

$$\Theta_{Armature\_Max} = 4.03049 \ deg$$

$$\Theta_{Armature\_Min} = -4.03049 \ deg$$

$$freq_{Gm} := 10 \cdot \frac{\omega_{n\_UncompensatedPlant}}{2 \cdot \pi} \Rightarrow freq_{Gm} = 374.492 \frac{1}{s}$$

$$V_{dd} := 5 \cdot volt$$

$$V_{Out\_Amp\_Max} := V_{dd} - 1 \cdot volt$$

$$V_{ee} := -5 \cdot volt$$

$$V_{Out\_Amp\_Min} := V_{ee} - 1 \cdot volt$$

Evaluation of $R_{Sense}$:

$$\frac{I_{Motor\_Max} \cdot TorqueConstant_{Actuator}}{K_{Spring}} = \Theta_{Armature\_Max} \Rightarrow I_{Motor\_Max} :=$$

$$\frac{\Theta_{Armature\_Max}}{TorqueConstant_{Actuator}} \cdot K_{Spring} \Rightarrow I_{Motor\_Max} = 0.083 \ A$$

to avoid exceeding the output capability of the amplifier, $R_{Sense}$ is to satisfy the relationship:

$$\left(I_{Motor\_Max} + \frac{I_{Motor\_Max} \cdot R_{Motor}}{R_{Sh}}\right) \cdot R_{Sense\_Max} + I_{Motor\_Max} \cdot R_{Motor} = V_{Out\_Amp\_Max}$$

$$R_{Sense\_Max} :=$$

$$\frac{R_{Sh} \cdot (V_{Out\_Amp\_Max} - I_{Motor\_Max} \cdot R_{Motor})}{R_{Sh} \cdot I_{Motor\_Max} - I_{Motor\_Max} \cdot R_{Motor}} \Rightarrow R_{Sense\_Max} = 16.675 \ \Omega$$

$$PowerDissipation_{R\_Sense} :=$$

$$\left(\frac{I_{Motor\_Max}}{\sqrt{12}}\right)^2 \cdot R_{Sense} \Rightarrow PowerDissipation_{R\_Sense} = 5.72 \times 10^{-3} \ watt$$

Evaluation of $RIn\_Gm$ and $R_{F\_Gm}$:

$$\gamma = \frac{R_f}{R_{in}}$$

$$I_{Motor} = I_{AmpOut}\left(\frac{R_{Sh}}{R_{Sh} - R_{Motor}}\right)$$

$$therefore \Rightarrow I_{AmpOut} = I_{Motor}\left(\frac{R_{Sh} - R_{Motor}}{R_{Sh}}\right)$$

$$and \Rightarrow e_\beta = I_{AmpOut} \cdot R_{Sense}$$

$$substituting \Rightarrow e_\beta = I_{Motor} \cdot \left(\frac{R_{Sh} + R_{Motor}}{R_{Sh}}\right) \cdot R_{Sense}$$

At the inverting input of the amplifier $\Rightarrow \frac{e_{in}}{R_{in}} = \frac{e_\beta}{R_f}$ $$therefore \Rightarrow \frac{e_{in}}{R_{in}} = \frac{I_{Motor} \cdot \left(\frac{R_{Sh} + R_{Motor}}{R_{Sh}}\right) \cdot R_{Sense}}{R_f}$$

$$since \Rightarrow Gm_0 = \frac{I_{Motor}}{e_{in}} \Rightarrow Gm_0 =$$

$$\frac{R_f}{R_{in}} \cdot \frac{R_{Sh}}{(R_{Sh} + R_{Motor}) \cdot R_{Sense}} \Rightarrow Gm_0 = \gamma \cdot \frac{R_{Sh}}{(R_{Sh} + R_{Motor}) \cdot R_{Sense}}$$

$$\gamma := Gm_{0\_Required} \cdot \left[\frac{(R_{Sh} + R_{Motor}) \cdot R_{Sense}}{R_{Sh}}\right] \Rightarrow \gamma = 0.304$$

$$R_{In\_Gm} := \frac{R_{F\_Gm}}{\gamma} \Rightarrow R_{In\_Gm} = 13896.1 \ \Omega$$

Evaluation of $C_{F\_Gm}$:
The cutoff frequency of the Gm amplifier was expressed as:

$$:= 10 \cdot \frac{\omega_{n\_UncompensatedPlant}}{2 \cdot \pi} \Rightarrow freq_{Gm} = 374.492 \ \frac{1}{s}$$

Therefore:

$$\frac{1}{R_f C_f} = 10 \cdot \omega_{n\_UncompensatedPlant}$$

$$C_{F\_Gm} := \frac{1}{R_{F\_Gm} \cdot (10 \cdot \omega_{n\_UncompensatedPlant})} \Rightarrow C_{F\_Gm} = 0.101 \ \mu Farad$$

Standard value: $C_{F\_Gm} = 0.1 \ \mu Farad$

Evaluation of $G_m$ Amplifier Open-Loop Transfer Function:
The Open Loop gain of the transconductance amplifier is given by the product:

$$LoopGain_{Gmf} = VoltageTransferRatio_{\alpha\_To\_\beta_f} \cdot VoltageTransferRatio_{\beta\_To\_\gamma_f} \cdot A_{OpenLoop\_OPA561_f}$$

Voltage divider from $\alpha$ to $\beta$:

$$VoltageTransferRatio_{\alpha\_To\_\beta} = \frac{\beta}{\alpha}$$

$$\beta = \alpha \cdot \frac{R_{Sense}}{R_{Sense} + Z_{\alpha\beta}}$$

$$Z_{\alpha\beta} = \left[(R_{Motor} + s \cdot L_{Motor})^{-1} + \frac{1}{R_{Sh}}\right]^{-1}$$

$$VoltageTransferRatio_{\alpha\_To\_\beta} = \frac{R_{Sense}}{R_{Sense} + \frac{1}{\frac{1}{R_{Motor} + s \cdot L_{Motor}} + \frac{1}{R_{Sh}}}}$$

$$VoltageTransferRatio_{\alpha\_To\_\beta_f} :=$$

$$R_{Sense} \cdot \frac{R_{Sh} + R_{Motor} + s_f \cdot L_{Motor}}{R_{Sense} \cdot R_{Sh} + R_{Sense} \cdot R_{Motor} + R_{Sense} \cdot s_f \cdot L_{Motor} + R_{Sh} \cdot R_{Motor} + R_{Sh} \cdot s_f \cdot L_{Motor}}$$

Voltage divider from $\beta$ to $\gamma$:

$$VoltageTransferRatio_{\beta\_To\_\gamma} = \frac{\gamma}{\beta}$$

-continued $$\gamma = \beta \cdot \frac{R_{in}}{R_{in} + Z_{feedback}}$$

$$Z_{feedback} = \left(\frac{1}{R_f} + s \cdot C_f\right)^{-1}$$

$$VoltageTransferRatio_{\beta\_To\_\gamma} = \frac{R_{in}}{R_{in} + \frac{1}{\frac{1}{R_f} + s \cdot C_f}}$$

$$VoltageTransferRatio_{\beta\_To\_\gamma_f} :=$$

$$\frac{R_{In\_Gm} + R_{In\_Gm} \cdot s_f \cdot C_{F\_Gm} \cdot R_{F\_Gm}}{R_{In\_Gm} + R_{In\_Gm} \cdot s_f \cdot C_{F\_Gm} \cdot R_{F\_Gm} + R_{F\_Gm}}$$

OPA561 open loop gain:

$$A_{0\_OPA561} := 10^5$$

$$freq_{3db\_OPA561} := 170 \cdot Hz$$

$$A_{OpenLoop\_OPA561_f} := A_{0\_OPA561} \cdot \frac{1}{s_f \cdot \frac{1}{2 \cdot \pi \cdot freq_{3db\_OPA561}} + 1}$$

Figure 6:
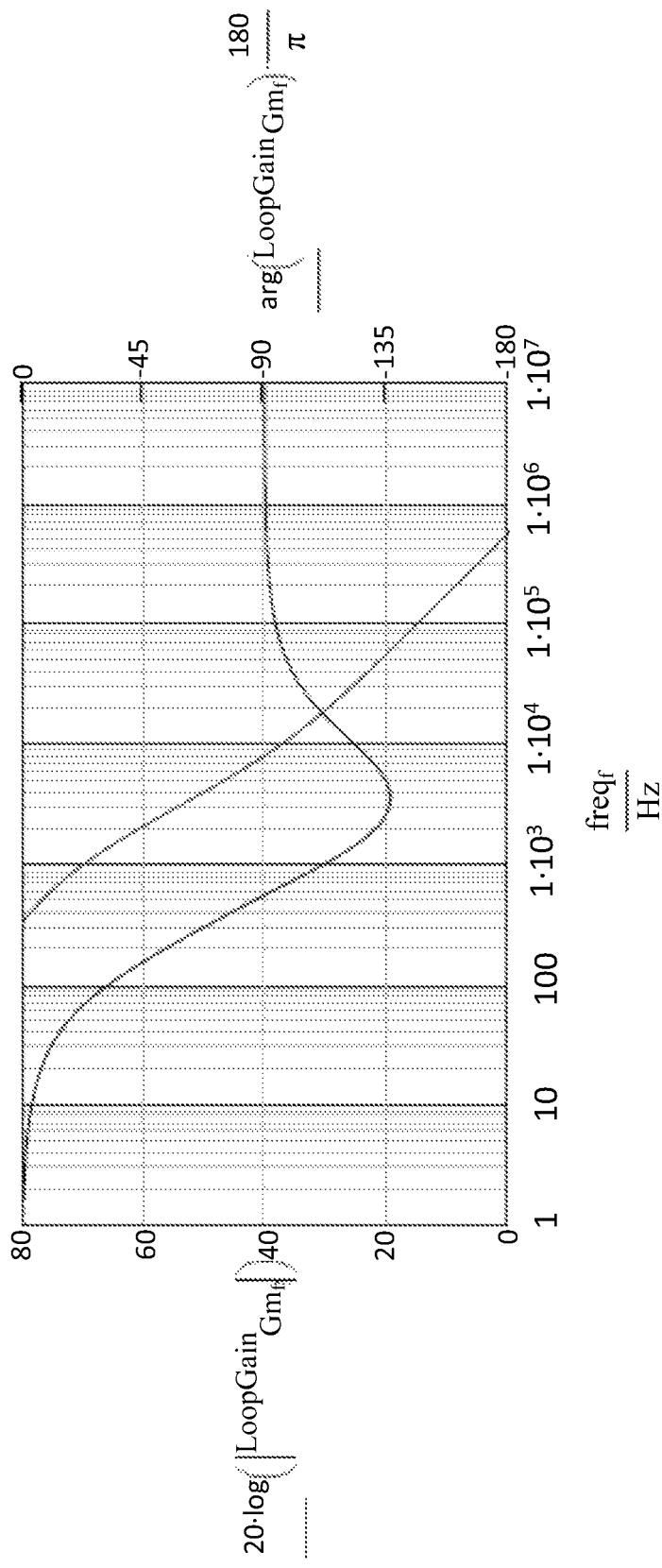
FIG. 6 shows a sample plot of a Transconductance (Gm) amplifier open-loop transfer function.

The above quantities were substituted into the expression for loop gain (SEE FIG. 6).

$$LoopGain_{Gm_f} := A_{OpenLoop\_OPA561_f} \cdot VoltageTransferRatio_{\alpha\_To\_\beta_f} \cdot VoltageTransferRatio_{\beta\_To\_\gamma_f}$$

Evaluation of $G_m$ Amplifier Closed-Loop Transfer Function:

$$VoltageTransferRatio_{\alpha\_To\_\beta_f} :=$$

$$R_{Sense} \cdot \frac{R_{Sh} + R_{Motor} + s_f \cdot L_{Motor}}{R_{Sense} \cdot R_{Sh} + R_{Sense} \cdot R_{Motor} + R_{Sense} \cdot s_f \cdot L_{Motor} + R_{Sh} \cdot R_{Motor} + R_{Sh} \cdot s_f \cdot L_{Motor}}$$

Figure 7:
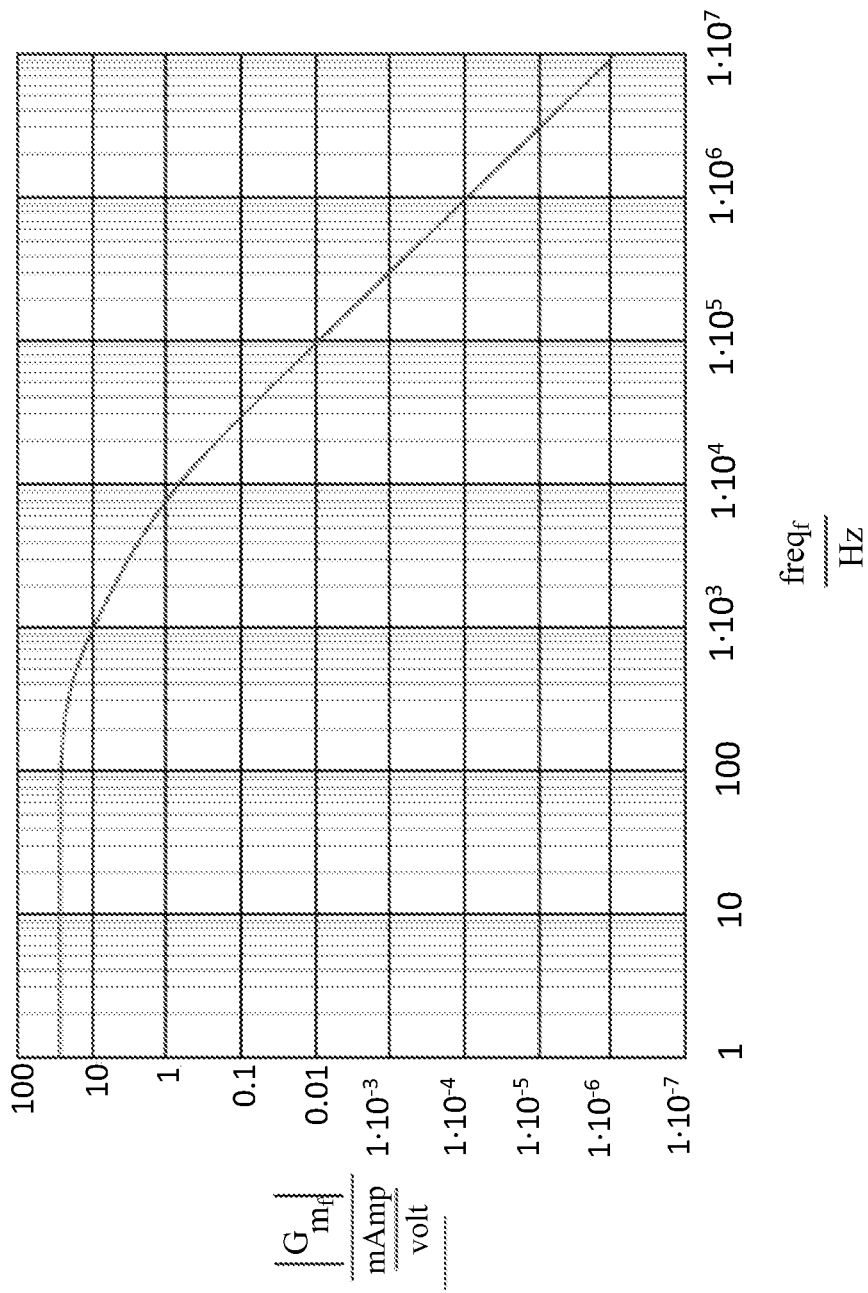
FIG. 7 shows a sample plot of a Gm amplifier closed-loop transfer function.

Voltage appearing across the motor (SEE FIG. 7):

$$Voltage_{Motor} = \alpha - \beta$$

$$Voltage_{Motor} = \alpha \cdot (1 - VoltageTransferRatio_{\alpha\_To\_\beta})$$

$$substituting \Rightarrow Voltage_{Motor} = \beta \cdot \left(\frac{1 - VoltageTransferRatio_{\alpha\_To\_\beta}}{VoltageTransferRatio_{\alpha\_To\_\beta}}\right)$$

$$I_{Motor} = \frac{Voltage_{Motor}}{R_{Motor} + s \cdot L_{Motor}}$$

$$substituting \Rightarrow I_{Motor} =$$

$$\beta \cdot \frac{1 - VoltageTransferRatio_{\alpha\_To\_\beta}}{VoltageTransferRatio_{\alpha\_To\_\beta} \cdot (R_{Motor} + s \cdot L_{Motor})}$$

$$solving\ for\ \beta \Rightarrow \beta = \frac{-I_{Motor}}{(-1) + VoltageTransferRatio_{\alpha\_To\_\beta}} \cdot VoltageTransferRatio_{\alpha\_To\_\beta} \cdot (R_{Motor} + s \cdot L_{Motor})$$

$$summing\ currents\ at\ the\ op\ input \Rightarrow \frac{e_{in}}{R_{in}} = \frac{\beta}{\left(\frac{1}{R_{F\_Gm}} + s \cdot C_{F\_Gm}\right)^{-1}}$$

$$substituting \Rightarrow -1 \cdot \frac{e_{in}}{R_{In\_Gm}} = \frac{I_{Motor}}{(-1) + VoltageTransferRatio_{\alpha\_To\_\beta}} \cdot$$

$$VoltageTransferRatio_{\alpha\_To\_\beta} \cdot (R_{Motor} + s \cdot L_{Motor}) \cdot \left(\frac{1}{R_{F\_Gm}} + s \cdot C_f\right)$$

$$\frac{-e_{in}}{R_{In\_Gm} \cdot VoltageTransferRatio_{\alpha\_To\_\beta} \cdot (R_{Motor} + s \cdot L_{Motor}) \cdot (1 + s \cdot C_{F\_Gm} \cdot R_{F\_Gm})}$$

$$[(-1) + VoltageTransferRatio_{\alpha\_To\_\beta}] \cdot R_{F\_G}$$

solving for the ratio $I_{Motor}/e_{in}$ $$\frac{I_{Motor}}{e_{in}} = \frac{-1}{R_{In\_Gm} \cdot VoltageTransferRatio_{\alpha\_To\_\beta} \cdot} \cdot$$

$$(R_{Motor} + s \cdot L_{Motor}) \cdot (1 + s \cdot C_{F\_Gm} \cdot R_{F\_Gm})$$

$$[(-1) + VoltageTransferRatio_{\alpha\_To\_\beta}] \cdot R_{F\_G}$$

$$therfore \Rightarrow Gm = \frac{-1}{R_{In\_Gm} \cdot VoltageTransferRatio_{\alpha\_To\_\beta} \cdot} \cdot$$

$$(R_{Motor} + s \cdot L_{Motor}) \cdot (1 + s \cdot C_{F\_Gm} \cdot R_{F\_Gm})$$

$$[(-1) + VoltageTransferRatio_{\alpha\_To\_\beta}]$$

substituting the Voltage Transfer Ratio expressions $$Gm = \frac{-1}{R_{in} \cdot R_{Sense} \cdot (R_{Sh} + R_{Motor} + s \cdot L_{Motor})} \cdot$$

$$\frac{R_{Sense} \cdot R_{Sh} + R_{Sense} \cdot R_{Motor} + R_{Sense} \cdot s \cdot L_{Motor} + R_{Sh} \cdot R_{Motor} + R_{Sh} \cdot s \cdot L_{Motor}}{(R_{Motor} + s \cdot L_{Motor}) \cdot (1 + s \cdot C_f R_f)} \cdot [(-1) +$$

$$R_{Sense}$$

$$Gm = \left(\frac{(R_{F\_Gm} \cdot R_{Sh})}{(R_{Sense} \cdot R_{In\_Gm} \cdot R_{Sh} + R_{Sense} \cdot R_{In\_Gm} \cdot R_{Motor})}\right) \cdot$$

$$\left[s^2 \cdot \left(\frac{R_{Sense} \cdot R_{In\_Gm} \cdot L_{Motor} \cdot C_{F\_Gm} \cdot R_{F\_Gm}}{R_{Sense} \cdot R_{In\_Gm} \cdot R_{Sh} + R_{Sense} \cdot R_{In\_Gm} \cdot R_{Motor}}\right) + s \cdot \left(\frac{R_{Sense} \cdot R_{In\_Gm} \cdot L_{Motor}}{R_{in\_Gm} \cdot R_{Motor}}\right)\right]$$

simplify $$G_{m_f} := \left[\frac{R_{F\_Gm} \cdot R_{Sh}}{R_{Sense} \cdot R_{In\_Gm} \cdot (R_{Sh} + R_{Motor})}\right] \cdot$$

$$\left[\frac{1}{(s_f)^2 \cdot \left(\frac{R_{F_{Gm}} \cdot L_{Motor} \cdot C_{F_{Gm}}}{R_{Sh} + R_{Motor}}\right) + \left(\frac{L_{Motor} + C_{F\_Gm} \cdot R_{F\_Gm} \cdot R_{Sh} + R_{Motor} \cdot C_{F_{Gm}} \cdot R_{F\_Gm}}{R_{Sh} + R_{Motor}}\right)}\right]$$

Verification of Closed-Loop Performance Requirements of $G_m$ Amplifier:

Low frequency transconductance $$gain \Rightarrow |G_{m_0}| = 27.411 \frac{mAmp}{volt} \quad Gm_{0\_Required} = 27.616 \frac{mAmp}{volt}$$

Output voltage excursion $\Rightarrow e_{Out\_OPA561\_Max} :=$ $$I_{Motor\_Max} \cdot (R_{Motor}) + I_{Motor\_Max} \cdot \left(1 - \frac{R_{Motor}}{R_{Sh}}\right) \cdot$$

$$R_{Sense} \Rightarrow e_{Out\_OPA561\_Max} = 3.396\ V$$

Closed-Loop Bandwidth $\Rightarrow G_{m\_3db} := \frac{|G_{m_0}|}{\sqrt{2}} \Rightarrow G_{m\_3db} = 19.382 \frac{mAmp}{volt}$ -continued evaluating the $Gm$ function at the 3 db frequency $\Rightarrow |G_{m257}| =$ $$19.51 \frac{mAmp}{volt} \Rightarrow freq_{257} = 371.535 \text{ Hz}$$

B. Lead Amplifier Circuit Synthesis (See FIG. 8):

Driving requirements provide that the product of the voltage at the Motor Low terminal and the Lead Amplifier Transfer Function is identical to the voltage observed at the Motor High when the Armature is locked. The output of the Lead Amplifier has a phase shift of 180 degrees (i.e., inversion).

The voltage at the Motor Bottom is:

$$e_{MotorBottom} = e_\beta = I_{Motor} \cdot \left(\frac{R_{Sh} + R_{Motor}}{R_{Sh}}\right) \cdot R_{Sense}$$

The ratio of the voltage at the Motor Bottom to that at the Motor Top is:

$$VoltageTransferRatio_{\alpha\_To\_\beta_f} =$$

$$R_{Sense} \cdot \frac{R_{Sh} + R_{Motor} + s_f \cdot L_{Motor}}{R_{Sense} \cdot R_{Sh} + R_{Sense} \cdot R_{Motor} + R_{Sense} \cdot s_f \cdot L_{Motor} + R_{Sh} \cdot R_{Motor} + R_{Sh} \cdot s_f \cdot L_{Motor}}$$

Therefore:

$$e_{MotorTop_f} = \frac{e_{MotorBottom_f}}{R_{Sense} \cdot \frac{R_{Sh} + R_{Motor} + s_f \cdot L_{Motor}}{R_{Sense} \cdot R_{Sh} + R_{Sense} \cdot R_{Motor} + R_{Sense} \cdot s_f \cdot L_{Motor} + R_{Sh} \cdot R_{Motor} + R_{Sh} \cdot s_f \cdot L_{Motor}}}$$

Dividing by the voltage at the Motor Bottom yields an expression for the required Lead Amplifier Closed Loop Transfer Function:

$$ClosedLoopGain_{LeadAmplifier} =$$

$$\frac{1}{R_{Sense} \cdot \frac{R_{Sh} + R_{Motor} + s_f \cdot L_{Motor}}{R_{Sense} \cdot R_{Sh} + R_{Sense} \cdot R_{Motor} + R_{Sense} \cdot s_f \cdot L_{Motor} + R_{Sh} \cdot R_{Motor} + R_{Sh} \cdot s_f \cdot L_{Motor}}}$$

$$ClosedLoopGain_{LeadAmplifier\_Required_f} :=$$

$$\left[\frac{R_{Sense} \cdot R_{Sh} + R_{Sense} \cdot R_{Motor} + R_{Sh} \cdot R_{Motor}}{R_{Sense} \cdot (R_{Sh} + R_{Motor})}\right] \cdot$$

$$\left[\frac{1 + s_f \cdot \left[L_{Motor} \cdot \left(\frac{R_{Sense} + R_{Sh}}{R_{Sense} \cdot R_{Sh} + R_{Sense} \cdot R_{Motor} + R_S}\right)\right]}{1 + s_f \cdot \left(\frac{L_{Motor}}{R_{Sh} + R_{Motor}}\right)}\right]$$

The Closed Loop Transfer Function of the Lead Amplifier has the form:

$$TransferFunction_{LeadAmp\_Required} = Gain_{LeadAmp\_0} \cdot \frac{s \cdot \tau_{LeadAmp\_Zero\_1} + 1}{s \cdot \tau_{LeadAmp\_Pole\_1} + 1}$$

-continued $$Gain_{LeadAmp\_0} :=$$

$$-1 \cdot \frac{R_{Sense} \cdot R_{Sh} + R_{Sense} \cdot R_{Motor} + R_{Sh} \cdot R_{Motor}}{R_{Sense} \cdot (R_{Sh} + R_{Motor})} \Rightarrow Gain_{LeadAmp\_0} = -3.728$$

$$\tau_{LeadAmp\_Zero\_1} :=$$

$$L_{Motor} \cdot \left(\frac{R_{Sense} + R_{Sh}}{R_{Sense} \cdot R_{Sh} + R_{Sense} \cdot R_{Motor} + R_{Sh} \cdot R_{Motor}}\right) \Rightarrow \tau_{LeadAmp\_Zero\_1} = 151.694 \ \mu Sec$$

$$\tau_{LeadAmp\_Pole\_1} := L_{Motor} \cdot \left(\frac{1}{R_{Sh} + R_{Motor}}\right) \Rightarrow \tau_{LeadAmp\_Pole\_1} = 18.184 \ \mu Sec$$

An expression for the Lead Amplifier Closed-Loop Response was developed:

$$e_{Out} = e_{In} \cdot (-1) \cdot \frac{Z_{Feedback}}{Z_{In}}$$

$$ClosedLoopGain_{LeadAmplifier} = \frac{e_{Out}}{e_{In}}$$

$$ClosedLoopGain_{LeadAmplifier} = (-1) \cdot \left(\frac{Z_{Feedback}}{Z_{In}}\right)$$

$$Z_{Feedback} = \left(\frac{1}{R_f} + s \cdot C_f\right)^{-1} \text{ and } \Rightarrow Z_{In} = \left(\frac{1}{R_{In}} + \frac{1}{R_{Stop} + \frac{1}{s \cdot C_{Lead}}}\right)^{-1}$$

$$ClosedLoopGain_{LeadAmplifier} =$$

$$\frac{[(-R_f) \cdot R_{Stop} \cdot C_{Lead} - R_f C_{Lead} \cdot R_{In}] \cdot s - R_f}{R_{In} \cdot s^2 \cdot C_f R_f R_{Stop} \cdot C_{Lead} + (R_{In} \cdot R_{Stop} \cdot C_{Lead} + R_{In} \cdot C_f R_f) \cdot s + R_{In}}$$

$$ClosedLoopGain_{LeadAmplifier} =$$

$$\frac{-R_f}{R_{In}} \cdot \frac{(R_{Stop} + R_{In}) \cdot C_{Lead} \cdot s + 1}{s^2 \cdot C_f R_f R_{Stop} \cdot C_{Lead} + s \cdot (R_{Stop} \cdot C_{Lead} + C_f R_f) + 1}$$

$$ClosedLoopGain_{LeadAmplifier} =$$

$$-1 \cdot \left(\frac{R_f}{R_{In}}\right) \cdot \left[\frac{s \cdot [(R_{In} + R_{Stop}) \cdot C_{Lead}] + 1}{(s \cdot R_{Stop} \cdot C_{Lead} + 1) \cdot (s \cdot C_f R_f + 1)}\right]$$

Therefore:

$$ClosedLoopGain_{LeadAmplifier} =$$

$$A_{0\_LeadAmplifier} \cdot \left[\frac{s \cdot (\tau_{Zero\_1\_LeadAmplifier}) + 1}{(s \cdot \tau_{Pole\_1\_LeadAmplifier} + 1) \cdot (s \cdot \tau_{Pole\_2\_LeadAmplifier} + 1)}\right]$$

$$A_{0\_LeadAmplifier} = -1 \cdot \frac{R_{F\_LeadAmplifier}}{R_{In\_LeadAmplifier}}$$

$$\tau_{Zero\_1\_LeadAmplifier} =$$

$$(R_{In\_LeadAmplifier} + R_{Stop\_LeadAmplifier}) \cdot C_{Lead\_LeadAmplifier}$$

$$\tau_{Pole\_1\_LeadAmplifier} = R_{Stop\_LeadAmplifier} \cdot C_{Lead\_LeadAmplifier}$$

$$\tau_{Pole\_2\_LeadAmplifier} = R_{f\_LeadAmplifier} \cdot C_{f\_LeadAmplifier}$$

In some embodiments, the frequency of the second pole is placed above the zero to achieve the desired Lead-Lag response.

Synthesis of Pole 1:

$$\tau_{LeadAmp\_Pole\_1} := L_{Motor} \cdot \left(\frac{1}{R_{Sh} + R_{Motor}}\right)$$

$$\tau_{Pole\_1\_LeadAmplifier} = R_{Stop\_LeadAmplifier} \cdot C_{Lead\_LeadAmplifier}$$

$$R_{Stop\_LeadAmplifier} \cdot C_{Lead\_LeadAmplifier} = L_{Motor} \cdot \left(\frac{1}{R_{Sh} + R_{Motor}}\right)$$

$$C_{Lead\_LeadAmplifier} := 0.02 \cdot \mu\text{Farad}$$

$$R_{Stop\_LeadAmplifier} :=$$

$$\frac{L_{Motor} \cdot \left(\frac{1}{R_{Sh} + R_{Motor}}\right)}{C_{Lead\_LeadAmplifier}} \Rightarrow R_{Stop\_LeadAmplifier} = 909.215\ \Omega$$

Standard Value: $R_{Stop\_LeadAmplifier} = 909 \cdot \text{ohm}$

Synthesis of Zero 1:

$$\tau_{Zero\_1\_LeadAmplifier} := L_{Motor} \cdot \frac{R_{Sense} + R_{Sh}}{R_{Sense} \cdot R_{Sh} + R_{Sense} \cdot R_{Motor} + R_{Sh} \cdot R_{Motor}}$$

$$\tau_{Zero\_1\_LeadAmplifier} = (R_{In\_LeadAmplifier} + R_{Stop\_LeadAmplifier}) \cdot C_{Lead\_LeadAmplifier}$$

$$R_{In\_LeadAmplifier} :=$$

$$L_{Motor} \cdot \frac{R_{Sense} + R_{Sh}}{R_{Sense} \cdot R_{Sh} + R_{Sense} \cdot R_{Motor} + R_{Sh} \cdot R_{Motor}} \cdot \left(\frac{1}{C_{Lead\_LeadAmplifier}}\right) -$$

$$R_{Stop\_LeadAmplifier} \Rightarrow R_{In\_LeadAmplifier} = 6675.72\ \Omega$$

Standard Value: $R_{In\_LeadAmplifier} = 6675.72\ \Omega$

Synthesis of $\text{Gain}_0$:

$$Gain_{LeadAmp\_0} = -1 \cdot \frac{R_{Sense} \cdot R_{Sh} + R_{Sense} \cdot R_{Motor} + R_{Sh} \cdot R_{Motor}}{R_{Sense} \cdot (R_{Sh} + R_{Motor})}$$

$$A_{0\_LeadAmplifier} = -1 \cdot \frac{R_{F\_LeadAmplifier}}{R_{In\_LeadAmplifier}}$$

$$R_{F\_LeadAmplifier} :=$$

$$R_{In\_LeadAmplifier} \cdot \left[\frac{R_{Sense} \cdot R_{Sh} + R_{Sense} \cdot R_{Motor} + R_{Sh} \cdot R_{Motor}}{R_{Sense} \cdot (R_{Sh} + R_{Motor})}\right] \Rightarrow$$

$$R_{F\_LeadAmplifier} = 24791.843\ \Omega$$

Standard value: $R_{F\_LeadAmplifier} = 24.9 \cdot \text{kOhm}$

Synthesis of Pole 2:

$$\tau_{Pole\_2} := 0.1 \cdot \tau_{LeadAmp\_Pole\_1}$$

$$\tau_{Pole\_2\_LeadAmplifier} = R_{F\_LeadAmplifier} \cdot C_{F\_LeadAmplifier}$$

$$C_{F\_LeadAmplifier} := \frac{\tau_{Pole\_2}}{R_{F\_LeadAmplifier}} \Rightarrow C_{F\_LeadAmplifier} = 73.029\ \text{pFarad}$$

Standard value: $C_{F\_LeadAmplifier} = 68 \cdot \text{pFarad}$

Figure 9:
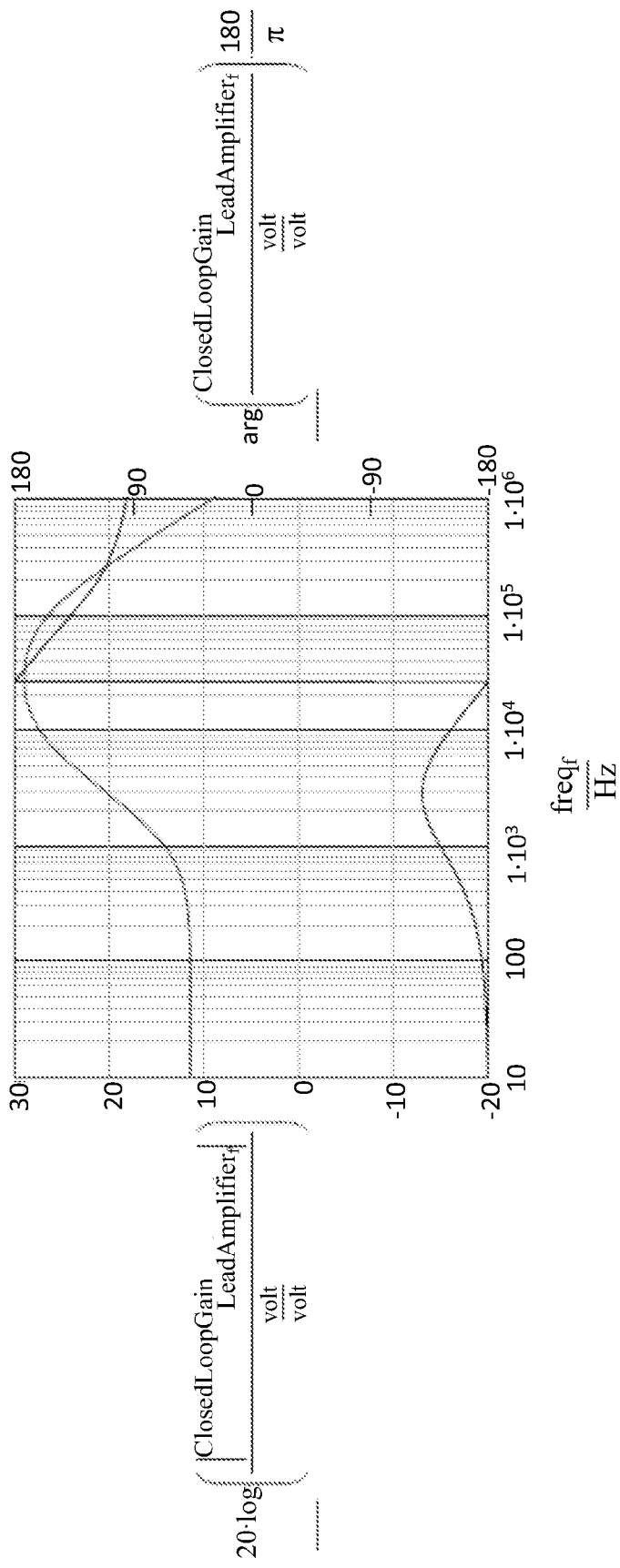
FIG. 9 shows a sample plot of a Phase-Lead (lead) amplifier closed-loop gain.

Evaluation of Lead Amplifier Closed-Loop Response by substitution of values determined during Lead Amplifier synthesis into the expression for the Lead amplifier Closed-Loop Transfer Function (SEE FIG. 9).

$$ClosedLoopGain_{LeadAmplifier_f} := \left(-1 \cdot \frac{R_{F\_LeadAmplifier}}{R_{In\_LeadAmplifier}}\right) \cdot$$

$$\left[\frac{s_f[(R_{In\_LeadAmplifier} + R_{Stop\_LeadAmplifier}) \cdot C_{Lead\_LeadAmplifier}]}{[s_f \cdot (R_{Stop\_LeadAmplifier} \cdot C_{Lead\_LeadAmplifier}) + 1] \cdot} \right.$$
$$\left. [s_f \cdot (R_{F\_LeadAmplifier} \cdot C_{F\_Lea}}\right]$$

The response of the Lead amplifier was validated:

$$I_{Motor\_Peak_f} := I_{Motor\_Max}$$

The voltage at the Motor Bottom when the motor is driven at $I_{Motor\_Peak}$:

$$e_{\beta\_Peak_f} := I_{Motor\_Peak_f} \cdot \left(\frac{R_{Sh} + R_{Motor}}{R_{Sh}}\right) \cdot R_{Se}$$

Multiplying by the Lead Amplifier Closed Loop Transfer Function yields an expression for the Locked-Armature output Voltage assuming a one-amp motor current:

$$e_{Out\_LeadAmp\_Peak_f} := \left[I_{Motor\_Peak_f} \cdot \left(\frac{R_{Sh} + R_{Motor}}{R_{Sh}}\right) \cdot R_{Sense}\right] \cdot$$

$$\left[\left(-1 \cdot \frac{R_{F\_LeadAmplifier}}{R_{In\_LeadAmplifier}}\right) \cdot \left[\frac{s_f \cdot [(R_{In\_LeadAmplifier} + R_{Stop\_LeadA}}{s_f \cdot (R_{Stop\_LeadAmplifier} \cdot C_{Lead\_Amplifier}) + 1}\right]\right.$$

The voltage at the Motor Top under conditions of a One-amp motor current is:

$$e_{MotorTop\_Peak_f} := \frac{I_{Motor\_Peak_f} \cdot \left(\frac{R_{Sh} + R_{Motor}}{R_{Sh}}\right) \cdot R_{Sense}}{R_{Sense} \cdot \frac{R_{Sh} + R_{Motor} + s_f \cdot L_{Motor}}{R_{Sense} \cdot R_{Sh} + R_{Sense} \cdot R_{Motor} +}}$$
$$R_{Sense} \cdot s_f \cdot L_{Motor} + R_{Sh} \cdot R_{Motor} + R_{Sh} \cdot s_f \cdot L_{Motor}$$

Figure 10:
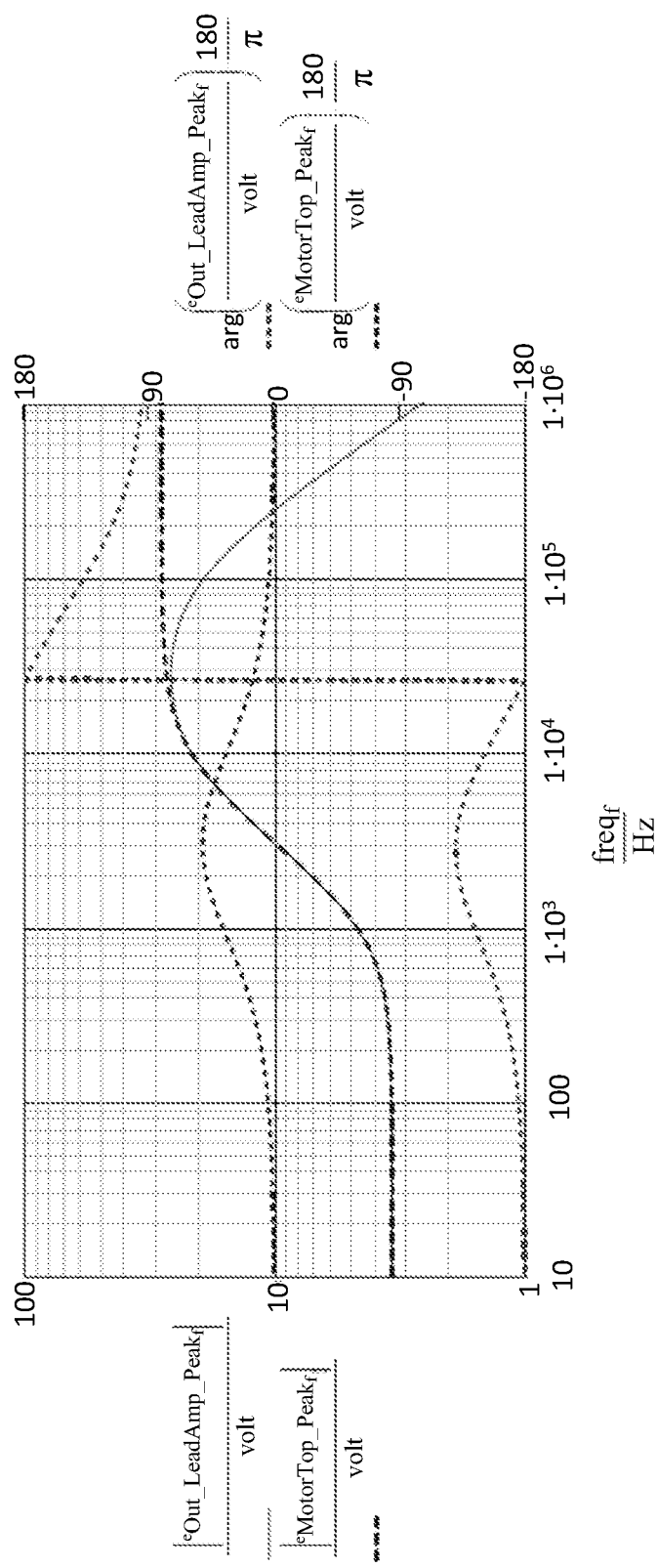
FIG. 10 shows a sample plot of lead amplifier peak output voltages for a locked armature.

Validation revealed that Lead Amplifier response was correct for frequencies below approximately 30 kHz (SEE FIG. 10).

C. Rate Summer Amplifier Circuit Synthesis (See FIG. 11):

The desired output of the Rate Summer Amplifier, according to the servo design is:

$$K_{RateSummer\_Required} = 0.425$$

An expression for the Rate Summer Closed-Loop Response was developed. Since the gains applied to both inputs are substantially, e.g. identical:

$$R_\beta = R_\alpha = R_{In\_RateSummer}$$

Transfer $Function_{RateSummer} =$ $$-1 \cdot (Gain_{0\_RateSummer}) \cdot \left(\frac{1}{s \cdot \tau_{Pole\_RateSummer} + 1}\right)$$

where $\Rightarrow \tau_{Pole\_RateSummer} = C_{f\_RateSummer} \cdot R_{f\_RateSummer}$ $$Gain_{0\_RateSummer} = -1 \cdot \left(\frac{R_{F\_RateSummer}}{R_{In\_RateSummer}}\right)$$

Synthesis of $\text{Pole}_{RateSummer}$:

$$\tau_{Pole\_RateSummer} := 0.05 \cdot \tau_{LeadAmp\_Pole\_1}$$

$$C_{F\_RateSummer} := 100 \cdot pFarad$$

$$\tau_{Pole\_RateSummer} = R_{F\_RateSummer} \cdot C_{F\_RateSummer}$$

$$\text{therfore} \Rightarrow R_{F\_RateSummer} := \frac{\tau_{Pole\_RateSummer}}{C_{F\_RateSummer}}$$

$$\Rightarrow R_{F\_RateSummer} = 9092.145\Omega$$

Standard value: $R_{F\ RateSummer} = 9090 \cdot ohm$

Synthesis of $\text{Gain}_{0\_Ratesummer}$:

$$K_{RateSummer\_Required} = 0.425$$

The subtraction required at the error amplifier was accomplished by an inversion implemented at the Rate Summer, absorbing this inversion into the Rate Summer design $$Gain_{0\_RateSummer} = -1 \cdot \frac{R_{F\_RateSummer}}{R_{In\_RateSummer}}$$

$$R_{In\_RateSummer} := \frac{R_{F\_RateSummer}}{K_{RateSummer\_required}} \Rightarrow R_{In\_RateSummer} = 21410.051\Omega$$

Standard value: $R_{In\_RateSummer} = 21500 \cdot ohm$ $$K_{RateSummer} := \frac{R_{F\_RateSummer}}{R_{In\_RateSummer}} \Rightarrow K_{RateSummer} = 0.423$$

D. The Feedback Branch Response to $I_{Motor}$ and $\Theta_{Armature}$ was evaluated.

The output of the Rate Summer is the superposition of two functions: The desired signal due to the motional EMF produced by the moving armature, and an error term arising from the incomplete rejection of the voltage produced by the motor current. The output of the Rate Summer is given by:

$$e_{Out\_RateSummer} = (e_{Out\_LeadAmplifier} + e_{MotorTop}) \cdot K_{RateSummer}$$

$$e_{Out\_LeadAmplifier} = \left[ I_{Motor} \cdot \left( \frac{R_{Sh} + R_{Motor}}{R_{Sh}} \right) \cdot R_{Sense} \right] \cdot$$

$$\left( -1 \frac{R_{F\_LeadAmplifier}}{R_{In\_LeadAmplifier}} \right) \cdot \left[ \frac{s_f \cdot [(R_{In\_LeadAmplifier} + R_{Stop\_LeadAmpl}}{[s_f \cdot (R_{Stop\_LeadAmplifier} \cdot C_{Lead\_LeadAmplifier}) + 1] \cdot [s} \right.$$

The component of the voltage appearing at the Motor Top due to motor current is:

$$e_{MotorTop\_LockedArmature} =$$

$$R_{Sense} \cdot \frac{I_{Motor} \cdot \left( \frac{R_{Sh} + R_{Motor}}{R_{Sh}} \right) \cdot R_{Sense}}{\frac{R_{Sh} + R_{Motor} + s_f \cdot L_{Motor}}{R_{Sense} \cdot R_{Sh} + R_{Sense} \cdot R_{Motor} +}}$$
$$R_{Sense} \cdot s \cdot L_{Motor} + R_{Sh} \cdot R_{Motor} + R_{Sh} \cdot s \cdot L_{Motor}$$

The Motor Top voltage due to Armature motion is:

$$e_{MotorTop\_Motional} = \left( \frac{d}{dt} \Theta_{Armature} \right) \cdot K_{BEMF} \cdot K_{RateSummer}$$

Substituting these terms into the expression for voltage at the output of the Rate Summer:

$$e_{Out\_RateSummer} = \left[ \frac{I_{Motor} \cdot \left( \frac{R_{Sh} + R_{Motor}}{R_{Sh}} \right) \cdot}{R_{Sense} \cdot K_{RateSummer}} \right] \cdot$$

$$\left[ \left( -1 \cdot \frac{R_{F\_LeadAmplifier}}{R_{In\_LeadAmplifier}} \right) \cdot \left[ \frac{s \cdot [(R_{In\_LeadAmplifier} + R_S}{[s \cdot (R_{Stop\_LeadAmplifier} \cdot C_{Lead\_LeadAm}} + \right. \right.$$

$$\left[ \frac{I_{Motor} \cdot \left( \frac{R_{Sh} + R_{Motor}}{R_{Sh}} \right) \cdot R_{Sense} \cdot K_{RateSummer}}{R_{Sense} \cdot \frac{R_{Sh} + R_{Motor} + s \cdot L_{Motor}}{R_{Sense} \cdot R_{Sh} + R_{Sense} \cdot R_{Motor} + R_{Sense} \cdot s \cdot L_{Motor} +}} \right] +$$
$$R_{Sh} \cdot R_{Motor} + R_{Sh} \cdot s \cdot L_{Motor}$$

$$\frac{d}{dt} \Theta_{Armature} \cdot K_{BEM}$$

At frequencies below mechanical resonance, the motor current may be expressed as a function of armature angle:

$$\Rightarrow \Theta_{Armature} = I_{Motor} \cdot \frac{TorqueConstant_{Actuator}}{K_{Spring}}$$

$$\text{therfore} \Rightarrow I_{Motor} = \Theta_{Armature} \cdot \frac{K_{Spring}}{TorqueConstant_{Actuator}}$$

$$e_{Out\_RateSummer} = \left[ \Theta_{Armature} \cdot \frac{K_{Spring}}{TorqueConstant_{Actuator}} \cdot \left( \frac{R_{Sh} + R_{Motor}}{R_{Sh}} \right) \cdot R_{Sense} \cdot \right.$$

$$\left. K_{RateSummer} \right] \cdot \left[ \left( -1 \cdot \frac{R_{F\_LeadAmplifier}}{R_{In\_LeadAmplifier}} \right) \cdot \left[ \frac{s_f \cdot [(\colon}{[s_f \cdot R_{Stop\_LeadA}} \right] \right] +$$

$$\left[ \frac{\Theta_{Armature} \cdot \frac{(K_{Spring})}{(TorqueConstant_{Actuator})} \cdot \left( \frac{R_{Sh} + R_{Motor}}{R_{Sh}} \right) \cdot}{R_{Sense} \cdot K_{RateSummer}} \right] +$$
$$\left( R_{Sense} \cdot \frac{(R_{Sh} + R_{Motor} + s_f \cdot L_{Motor})}{\begin{pmatrix} R_{Sense} + R_{Sh} + R_{Sense} \cdot R_{Motor} + \\ R_{Sense} \cdot s_f \cdot L_{Motor} + R_{Sh} \cdot R_{Motor} + \\ R_{Sh} \cdot s_f \cdot L_{Motor} \end{pmatrix}} \right)$$

$$\frac{d}{dt} \Theta_{Armature} \cdot K_{BEMF} \cdot K_R$$

The portion of the Rate Summer output voltage that is due to the motional EMF produced by the armature constitutes the feedback signal.

$$FeedbackSignal_{Motional} = \Theta_{Armature} \cdot s \cdot K_{BEMF} \cdot K_{RateSummer}$$

The portion of the Rate Summer output voltage that is due solely to the Motor Current constitutes the feedback error, this is given by:

$$FeedbackError_{I\_Motor} =$$

$$\left[ \Theta_{Armature} \cdot \frac{K_{Spring}}{TorqueConstant_{Actuator}} \cdot \left( \frac{R_{Sh} + R_{Motor}}{R_{Sh}} \right) \cdot R_{Sense} \cdot K_{RateSummer} \right] \cdot$$

$$\left[\left(-1 \cdot \frac{R_{F\_LeadAmplifier}}{R_{In\_LeadAmplifier}}\right) \cdot \left[\frac{1}{s \cdot R_{Stop}}\right]\right] +$$

$$\left[\Theta_{Armature} \cdot \frac{K_{Spring}}{TorqueConstant_{Actuator}} \cdot \frac{\left(\frac{R_{Sh}+R_{Motor}}{R_{Sh}}\right) \cdot R_{Sense} \cdot K_{RateSummer}}{R_{Sense} \cdot \frac{R_{Sh}+R_{Motor}+s \cdot L_{Motor}}{R_{Sense}+R_{Sh}+R_{Sense} \cdot R_{Motor}+R_{Sense} \cdot s \cdot L_{Motor}+R_{Sh} \cdot R_{Motor}+R_{Sh} \cdot s \cdot L_{Motor}}}\right]$$

Figure 12:
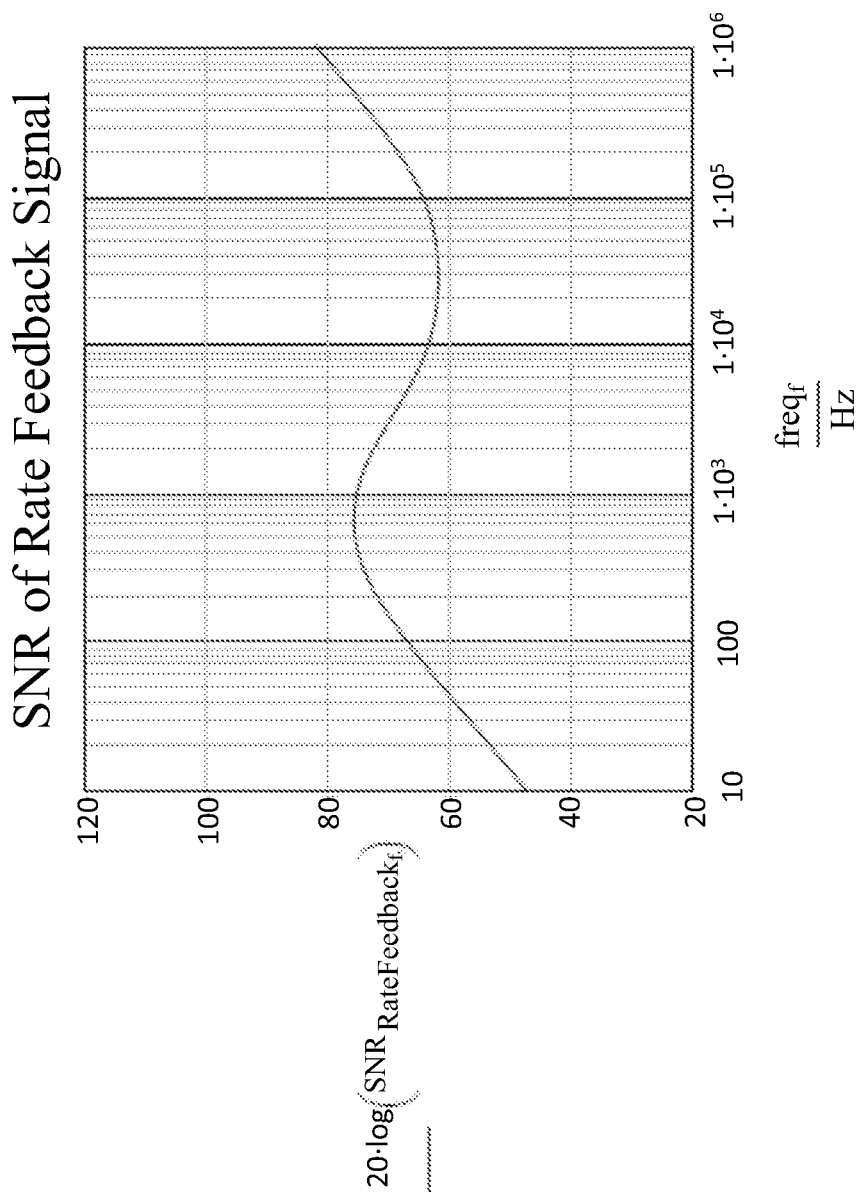
FIG. 12 shows a plot of SNR of rate feedback signal.

Taking the ration of the feedback signal and the feedback error yields an expression for the SNR of the Feedback signal (SEE FIG. 12)

$$SNR_{RateFeedback_f} = \left[\frac{s_f \cdot K_{BEMF} \cdot K_{RateSummer}}{\left[\frac{K_{Spring}}{TorqueConstant_{Acutator}} \cdot \left(\frac{R_{Sh}+R_{Motor}}{R_{Sh}}\right) \cdot R_{Sense} \cdot K_{RateSummer}\right]}\right] \cdot$$

$$\left[\left(-1 \cdot \frac{R_{F\_LeadAmplifier}}{R_{In\_LeadAmplifier}}\right) \cdot \left[\frac{s_f \cdot [(R_{in_{Lead}})}{s_f \cdot (R_{Stop_{LeadAmplifier}})} + \right.\right.$$

$$\left[\frac{\left(\frac{K_{Spring}}{TorqueConstant_{Actuator}} \cdot \left(\frac{R_{Sh}+R_{Motor}}{R_{Sh}}\right) \cdot R_{Sense} \cdot K_{RateSummer}\right)}{\left(R_{Sense} \cdot \frac{R_{Sh}+R_{Motor}+s_f \cdot L_{Motor}}{R_{Sense}+R_{Sh}+R_{Sense} \cdot R_{Motor}+R_{Sense} \cdot s_f \cdot L_{Motor}+R_{Sh} \cdot R_{Motor}+R_{Sh} \cdot s_f \cdot L_{Motor}}\right)}\right]$$

Figure 13:
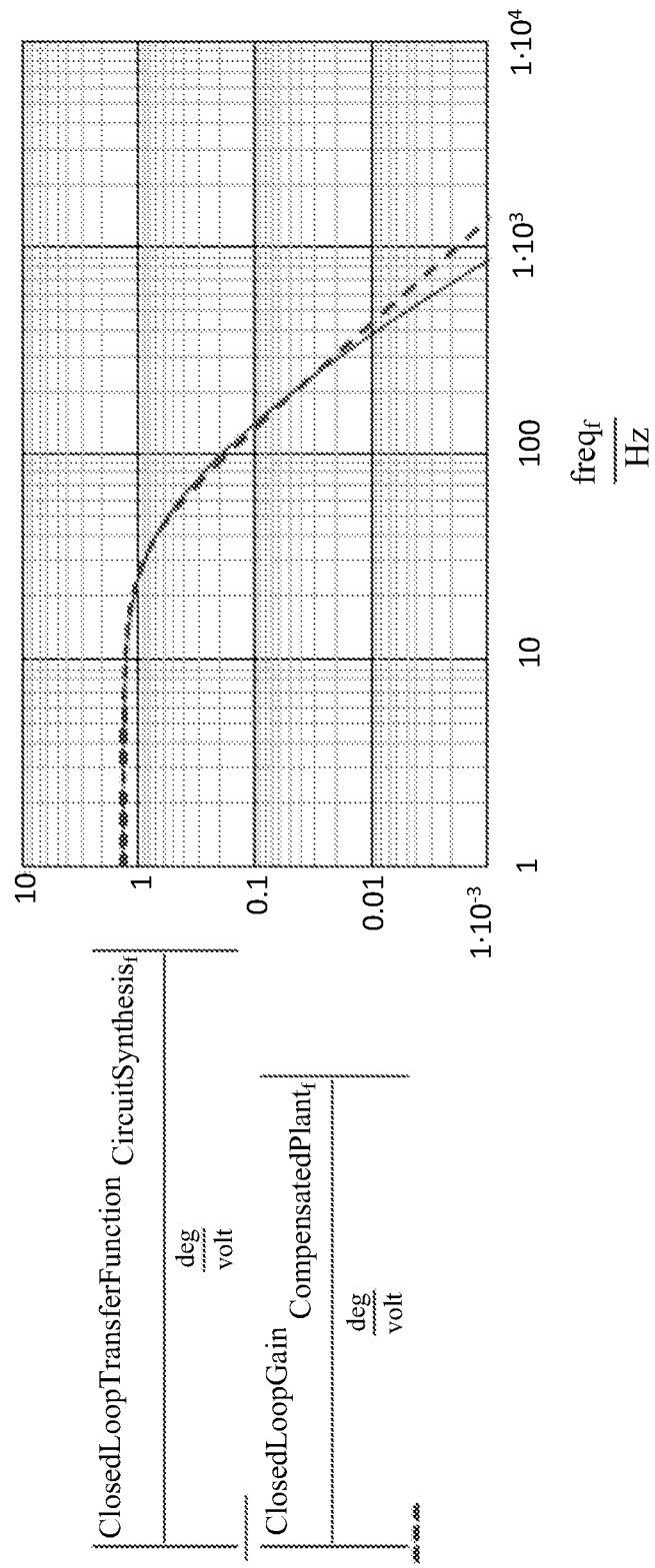
FIG. 13 shows a plot of transfer function of synthesized circuits.

E. Closed-Loop Transfer Function of Synthesized Circuits were compared to the required response, assuming standard-value components (See FIG. 13).

$$ForwardGain = \frac{\Theta_{Armature}}{e_{Out\_RateSummer}}$$

$$ForwardGain_{Synthesis} = G_m \cdot K_{UncompensatedPlant}$$

$$FeedbackGain_{Synthesis} = \frac{e_{Out\_RateSummer}}{\Theta_{Armature}}$$

$$ForwardGain_f = \left[\frac{R_{F\_Gm} \cdot R_{Sh}}{R_{Sense} \cdot R_{In\_Gm} \cdot (R_{Sh}+R_{Motor})}\right] \cdot$$

$$\left[\frac{1}{(s_f)^2 \cdot \left(\frac{R_{F\_Gm} \cdot L_{Motor} \cdot C_{F\_Gm}}{R_{Sh}+R_{Motor}}\right) + s_f \left(\frac{L_{Motor}+C_{F\_Gm} \cdot R_{F\_Gm} \cdot R_{Sh}+R_{Motor} \cdot C_{F\_Gm} \cdot R}{R_{Sh}+R_{Motor}}\right)}\right]$$

$$FeedbackGain_f := \left[\left[\frac{K_{Spring}}{TorqueConstant_{Actuator}} \cdot \left(\frac{R_{Sh}+R_{Motor}}{R_{Sh}}\right) \cdot R_{Sense} \cdot K_{RateSummer}\right] \cdot \left[\left(-1 \cdot \frac{R_{F\_LeadAmplifier}}{R_{In\_LeadAmplifier}}\right) \cdot \left[\frac{s_f \cdot [(R_{in_{LeadAmp}})}{s_f \cdot (R_{Stop\_LeadAmplifier} \cdot C_{Lea})} + \right.\right.\right.$$

$$\left[\frac{\frac{K_{Spring}}{TorqueConstant_{Actuator}} \cdot \left(\frac{R_{Sh}+R_{Motor}}{R_{Sh}}\right) \cdot R_{Sense} \cdot K_{RateSummer}}{R_{Sense} \cdot \frac{R_{Sh}+R_{Motor}+s_f \cdot L_{Motor}}{R_{Sense}+R_{Sh}+R_{Sense} \cdot R_{Motor}+R_{Sense} \cdot s_f \cdot L_{Motor}+R_{Sh} \cdot R_{Motor}+R_{Sh} \cdot s_f \cdot L_{Motor}}}\right] +$$

$$s_f \cdot K_{BEMF} \cdot K_{RateSummer}$$

$$ClosedLoopTransferFunction_{CircuitSynthesis_f} :=$$

$$\frac{ForwardGain_f}{1+ForwardGain_f \cdot FeedbackGain_f}$$

Any publications and patents mentioned in the present application are herein incorporated by reference. Various modification and variation of the described methods and compositions will be apparent to those skilled in the art without departing from the scope and spirit of the invention. Although specific embodiments have been described, it should be understood that the claims should not be unduly limited to such specific embodiments. Indeed, various modifications of the described modes and embodiments that are obvious to those skilled in the relevant fields are intended to be within the scope of the following claims. Moreover, while the techniques, systems, methods and approaches have been described with respect to specific devices, it is to be apparent that a variety of systems and devices may benefit from the methods, devices, and systems described herein. Examples include, but are not limited to optical based media devices, precision manufacturing devices, optical computing systems, optical measuring devices, line-of-sight communication systems, optical communication devices, and so forth.

I claim:

1. A method of electrically-augmented damping of an actuator, comprising: subtracting a rate-feedback voltage from an actuator command voltage, wherein the rate feedback voltage is derived from measurement of voltage across the actuator and a current flowing through the actuator, wherein the voltage across the actuator comprises a component due to flow of current through impedances of the actuator, and a component due to movement of an armature included in the actuator, and wherein the rate-feedback voltage is derived by subtracting from the voltage across the actuator a voltage component due to the flow of current through the impedances of the actuator.

2. The method of claim 1, wherein the voltage equal to the component due to the flow of current through the impedances of the actuator is derived by scaling voltage appearing at a terminal β of the actuator.

3. The method of claim 2, wherein the voltage appearing at the terminal β of the actuator is a function substantially of the current flowing through the actuator.

4. A device comprising an actuator and comprising a system for electrically-augmented damping by the method of claim 1.

5. The device of claim 4, wherein a rate-feedback voltage is subtracted from an actuator command voltage to effectively damp the actuator.

6. The device of claim 5, wherein the rate feedback voltage is derived from measurement of voltage across the actuator and current flowing through the actuator.

7. A device including circuitry for providing electrically-augmented damping of a voice-coil actuator, comprising:
   a) a transconductance amplifer A1 configured to provide an output that is a function of:
      i) command voltage, and
      ii) a rate-feedback voltage;
   b) a voice-coil actuator, including:
      i) a permanent magnet,
      ii) a terminal α,
      iii) a terminal β, and
      iv) an armature configured to carry current through a magnetic field associated with the permanent magnet;
   c) an amplifier A2 configured to provide an output that is a function of voltage appearing at the terminal β of the voice-coil actuator; and
   d) an amplifier A3 configured to provide an output that is a function of:
      i) voltage appearing at the terminal a of the voice-coil actuator, and
      ii) a voltage proportional to the voltage appearing at the terminal a of the voice-coil actuator due to a flow of current through the voice-coil actuator.

8. The device of claim 7, wherein the device and voice-coil actuator are configured to cause the output of the amplifier A1 to flow into the voice-coil actuator.

9. The device of claim 7, wherein the voltage appearing at the terminal β of the voice-coil actuator is a function of the flow of current through the voice-coil actuator.

10. The device of claim 7, wherein the voltage appearing at the terminal α of the voice-coil actuator is a function of:
   i) the flow of current through the voice-coil actuator, and
   ii) the movement of the armature through the magnetic field.

11. The device of claim 7, wherein the amplifier A2 is configured to scale and invert the voltage appearing at the terminal β of the voice-coil actuator to produce a voltage equal in magnitude to, but 180 degrees out of phase with, the voltage across appearing at the terminal a of the voice-coil actuator due to the flow of current through the voice-coil actuator.

12. The device of claim 7, wherein the amplifier A3 is configured to provide an output that is the sum of the output of amplifier A2 and the voltage appearing at the terminal α of the voice-coil actuator.

13. The device of claim 12, wherein the amplifier A3 is configured to provide an output that is equal to the voltage resulting from the movement of the armature through the magnetic field.

14. The device of claim 13, wherein the amplifier A3 is configured to output the rate-feedback voltage.

\* \* \* \* \*